United States Patent
Navarro et al.

(10) Patent No.: US 11,262,764 B2
(45) Date of Patent: Mar. 1, 2022

(54) COMPUTER-IMPLEMENTED METHOD AND A SYSTEM FOR DEFINING A PATH FOR A VEHICLE WITHIN AN ENVIRONMENT WITH OBSTACLES

(71) Applicant: The Boeing Company, Chicago, IL (US)

(72) Inventors: Francisco A. Navarro, Madrid (ES); Lucas Rodriguez Diaz, Seville (ES); Ernesto Valls Hernandez, Madrid (ES)

(73) Assignee: The Boeing Company, Chicago, IL (US)

( * ) Notice: Subject to any disclaimer, the term of this patent is extended or adjusted under 35 U.S.C. 154(b) by 335 days.

(21) Appl. No.: 16/570,979

(22) Filed: Sep. 13, 2019

(65) Prior Publication Data
US 2020/0089239 A1    Mar. 19, 2020

(30) Foreign Application Priority Data

Sep. 14, 2018    (EP) .................................... 18382660

(51) Int. Cl.
*G05D 1/02*    (2020.01)
(52) U.S. Cl.
CPC ... *G05D 1/0214* (2013.01); *G05D 2201/0213* (2013.01)
(58) Field of Classification Search
None
See application file for complete search history.

(56) References Cited

U.S. PATENT DOCUMENTS 10,466,058 B2 * 11/2019 Grimm .................... G08G 9/02
2019/0056743 A1 * 2/2019 Alesiani ............... G05D 1/0274

FOREIGN PATENT DOCUMENTS

| EP | 2428771 A1 | 3/2012 |
| EP | 3306431 A1 | 4/2018 |
| WO | 2017144350 A1 | 8/2017 |

OTHER PUBLICATIONS

Ponamgi, Madhav K., Dinesh Manocha, and Ming C.Lin. "Incremental algorithms for collision detection between polygonal models."IEEE Transactions on Visualization and Computer Graphics 3.1: 51-64. (Year: 1997).*

(Continued)

*Primary Examiner* — Thomas G Black
*Assistant Examiner* — Ana D Thomas
(74) *Attorney, Agent, or Firm* — Ostrager Chong Flaherty & Broitman P.C.

(57) ABSTRACT

A computer-implemented method and a system for generating a path for a vehicle from a source to a target within a two-dimensional (2D) environment with one or more obstacles is disclosed. The obstacles may be dynamic, static or both. The method comprises generating, in a two dimensions-plus-time space, a velocity cone that represents a set of potential waypoints reachable from a first source for the vehicle moving at a speed, providing a polytope, obtaining at least one interception polygon by intersecting and projecting the velocity cone with the polytope on the 2D region; generating a 2D scene comprising interception polygons to avoid, computing a visibility graph algorithm for the 2D scene and obtaining a plurality of conflict-free sub-paths, and composing a valid path connecting the source to the target based on the plurality of conflict-free sub-paths.

20 Claims, 12 Drawing Sheets

(56) References Cited

OTHER PUBLICATIONS

Analooee, Ali, Shahram Azadi, and Reza Kazemi. "Time Distance: A Novel Collision Prediction and Path Planning Method." arXiv preprint arXiv: 1907.03244. (Year: 2019).*

Jiménez, P., Federico Thomas, and Carme Torras. "Collision detection algorithms for motion planning. "Robot motion planning and control. Springer, Berlin, Heidelberg, 305-343. (Year: 1998).*

Chen, Han, Peng Lu, and Chenxi Xiao."Dynamic obstacle avoidance for uavs using a fast trajectory planning approach."IEEE International Conference on Robotics and Biomimetics (ROBIO). IEEE, 2019. (Year: 2019).*

Jimenez et al., "Collision Detection Algorithms for Motion Planning", Chapter 6 in: Robot Motion Panning and Control, Jean-Paul Laumond (editor), Laboratoire d'Analye et d'Architecture des Systemes, Centre National de la Recherche Scientifique, LAAS Report 97438, pp. 305-343 (previously published in Lecture Notes in Control and Information Sciences, vol. 229, 1998).

European Search Report dated Mar. 14, 2019 in European Patent Application No. 183826601 (from which the instant U.S. application claims priority).

\* cited by examiner

SINGLE GRAPH

PARALLEL GRAPH

COMPOSITE GRAPH

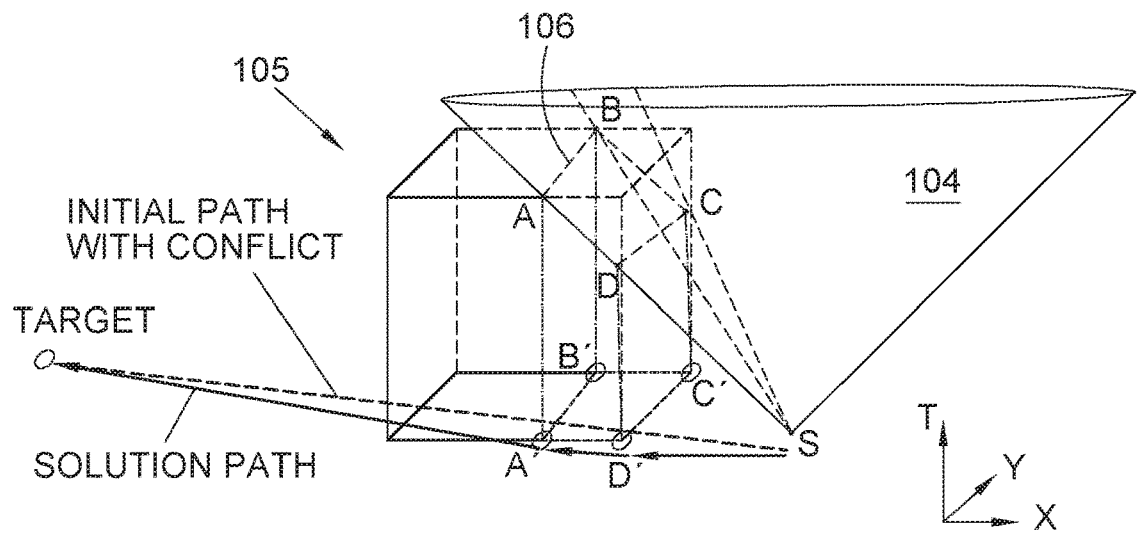
FIG. 13
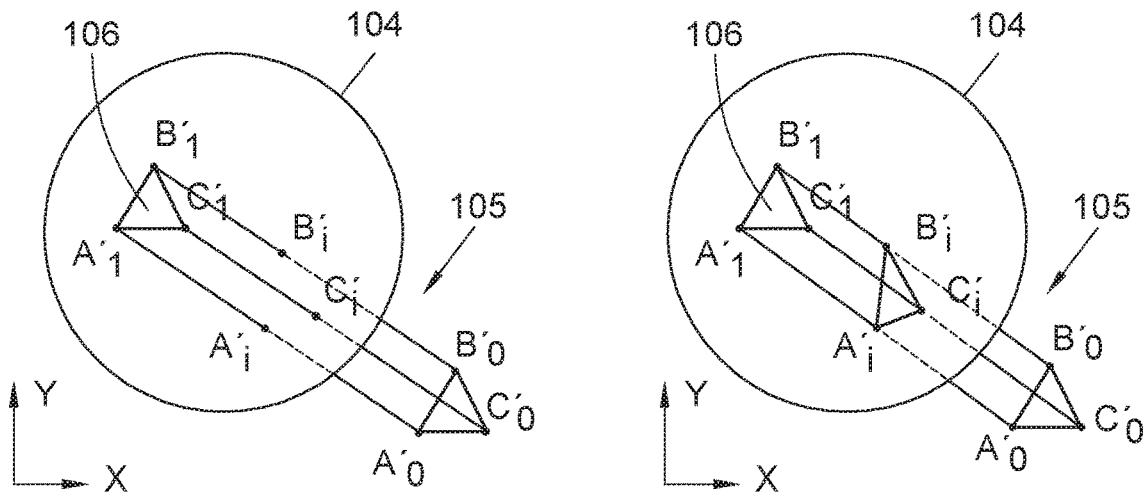
FIG. 14
FIG. 15
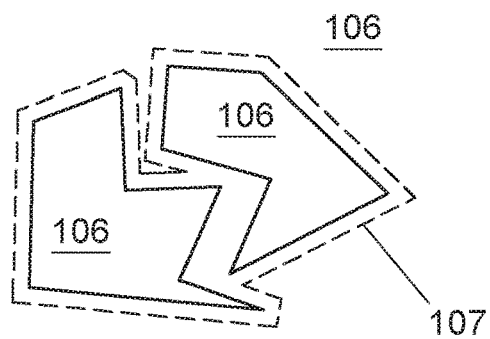
FIG. 16

COMPUTER-IMPLEMENTED METHOD AND A SYSTEM FOR DEFINING A PATH FOR A VEHICLE WITHIN AN ENVIRONMENT WITH OBSTACLES

RELATED PATENT APPLICATION

This application claims the benefit of foreign priority pursuant to 35 U.S.C. § 119(b) from European Patent Application No. 18382660.1 filed on Sep. 14, 2018.

FIELD

The present disclosure generally teaches techniques related to path finding in environments where obstacles may move or change their shape over time. In particular, the teachings further relate to planning and real-time guidance applications, including those of unmanned aerial vehicles, ground robots and other moving autonomous vehicles.

BACKGROUND

Recently, autonomous systems such as unmanned aerial vehicles (UAVs) and self-driving personal vehicles have become ubiquitous and keep growing steadily. Hence, techniques for generating efficient paths for different types of vehicles are creating high expectations and becoming a demand.

A large variety of different algorithms are available in the art. The solutions can be mainly classified in optimization-based, evolutionary algorithms, potential fields, probabilistic methods and roadmap approaches.

Most previous works on this topic derive from robotics science. Nevertheless, the definition of feasible autonomous paths with no human intervention represents a major challenge. Nowadays, more robust and efficient algorithms are still a need in the industry.

Autonomous vehicles like UAVs typically include sensors for gathering information of an environment through which the vehicle navigates, which requires a large amount of computing power to avoid obstacles in a reliable manner while finding a valid path to a target or destination. The processing of data is normally too slow to be useful within an environment with obstacles in real-time applications. Still more, if there are moving obstacles or their shapes are changing.

In view of the above shortcomings, there is room for improving known solutions. Specifically, when obstacles are approaching to a travel path and quick evasive maneuvers are required.

SUMMARY

The present disclosure proposes an autonomous generation of conflict-free lateral paths in the presence of static and/or dynamic obstacles.

A static obstacle can be represented by an unchanging geometric polygon. In turn, a dynamic obstacle can also be represented by a geometric polygon, which may change not only its position over time (i.e., moving obstacle) but also its physical shape (i.e., morphing polygons) in a known way.

The concept of obstacle should be construed in a broad sense, not only a physical object but also a surrounding terrain, a no-incursion zone like a restricted area should be considered an obstacle. If they are motionless, they are considered static obstacles. Alternatively, if their shape and/or position changes, they are considered dynamic.

Examples of dynamic obstacles may typically be areas subject to a meteorological alert, like a storm contour, or the uncertainty contour of an aircraft.

Advantageously, an aspect of the present teachings finds a free-collision path in an area including both types of obstacles, static and dynamic ones. A combination of heuristic, geometric and computational algorithms provides an efficient and robust solution, which can be useful for producing instructions to guide different kinds of moving vehicles, such as fixed-wing aircraft, rotorcraft, ground robots, etc. In this regard, the heuristic may be construed as a particular decision-making criterion used to select an option rather than others. That is, a way of measuring that may consider different metrics.

The present disclosure also uses the common tangent concept of a geometrical figure, normally a polygon. A common tangent is a line touching the geometrical figure such that the whole figure lies to the same side of the line. In case of polygons, finding common tangents can be viewed as finding extreme vertices of the polygon. Such representation may simplify implementation and reduce the number of vertices to consider. A common tangent segment is a portion of a common tangent line whose end points are the source, the target or the polygon vertices.

In general, the term path finding relates to a collection of techniques for finding an optimal (e.g., safest, shortest, etc.) route between two points, namely a source and a target, within an environment with obstacles. An optimal path is usually defined by a set of legs (at least one leg), each one defined between two waypoints. A visibility graph is one of the possible techniques used to find such path and define its legs. A visibility graph is a roadmap, a route that stores the visibility relationships between a set of objects considered as obstacles, which are normally defined by polygons. The visibility graph is basically made up of visible nodes and weighted edges. Visible nodes represent safe potential waypoints of the path that are mutually connected by edges, which represent the legs of such path. Each edge carries a weight defined by a cost function, which is usually the Euclidean distance between the nodes. The joint of different edges or legs provides a sub-path. Thus, a sub-path defines a way of reaching a waypoint from another waypoint.

A valid path may comprise several sub-paths connected one to another to allow reaching the target. The creation of a visibility graph is a complex task that usually requires high computational times to provide a feasible response.

Normally, visibility-based path finding approaches represent obstacles by geometric figures (e.g., polygons, circles, etc.) since there are no performance losses related to discretization.

It is generally recognized that the construction of traditional visibility graphs is inefficient for moderately intricate environments. To overcome or at least mitigate some of the existing limitations, the disclosed teachings provide new techniques to carry out fewer checks. Pruning strategies are proposed to allow filtering out non-essential information usually provided in real-world operational environments and to prioritize a list of candidate waypoints to reach the target.

In order to facilitate the identification of shortest paths in dynamic environments, the present disclosure makes use of a space of two dimensions plus time, notated as 2D+t space.

The 2D+t space is an expansion of the Cartesian space in which the Z coordinate is used to represent time. By doing so, dynamic environments can be represented statically.

In the 2D+t space, 2D polygons represent static obstacles. As to dynamic obstacles, since they may change position (moving obstacles), shape (morphing obstacles) or both over time, they are represented in the 2D+t space as polytopes.

A polytope is generally defined as a finite region of an n-dimensional space enclosed by a finite number of hyperplanes. Particularly in this disclosure, a polytope refers to a volumetric shape that describes the evolution of a 2D polygon's vertices through time.

Another important concept used is the velocity cone, which is a surface in the 2D+t space that represents an evolution through time of possible points that are reachable for a vehicle moving in a 2D plane at a constant speed from a source. Consequently, the slope of a velocity cone is the speed value whereas the vertex of a velocity cone is the source at an initial time.

An interception polygon is the result of the intersection of the obstacles' polytopes and the velocity cone. Such intersection produces a non-planar surface, thus projecting the non-planar surface on a 2D plane to produce a "working scene" with interception polygons to avoid in order to reach the target without conflicts.

In particular, the present disclosure is aimed at a computer-implemented method and a system for obstacle avoidance capable of being reliable and less computing demanding.

The computer-implemented method allows generating a path for a vehicle to move from a first source to a target within a 2D environment with one or more obstacles, the one or more obstacles being a static obstacle, a dynamic obstacle, or both, by performing the following tasks:

Generating, in a 2D+t space, a velocity cone having a slope corresponding to a first speed of the vehicle and an apex at the first source at an initial time. The velocity cone represents a set of potential waypoints reachable from the first source for the vehicle moving at the first speed.

For each static or dynamic obstacle present in the 2D environment, providing a polytope in the 2D+t space. The polytope represents a 2D polygon modeling an obstacle at an initial time with its evolution over time.

Obtaining one or more interception polygons by intersecting the velocity cone with the polytope in the 2D+t space, thereby forming a non-planar surface, and projecting the non-planar surface on the 2D environment.

Generating a first 2D scene comprising the one or more interception polygons to avoid.

Computing a visibility graph algorithm for the generated first 2D scene based on a first number of vertices associated with the one or more interception polygons and obtaining a plurality of conflict-free sub-paths for the vehicle to traverse that avoids each static or dynamic obstacle.

Composing a valid path connecting the first source to the target based on the plurality of conflict-free sub-paths.

Optionally, the method may produce a set of instructions for guiding the vehicle among the obstacles according to the valid path.

The visibility graph algorithm may apply a vertex reduction heuristic based on checking visibility of a segment from the first source to the target among the one or more interception polygons. A segment is visible when it does not cross anything.

The vertex reduction heuristic may be further based on computing a common tangent segment to each interception polygon being crossed. The endpoints of the common tangent segment can be added to a list as potential waypoints. Backtracking the potential waypoints from the target to the first source provides a set of sub-paths that form a valid path.

A waypoint is said to be included in a sub-path since it forms part of the sub-path. Said included waypoint also becomes a second source to construct a subsequent velocity cone until the target is reached.

If the vehicle can change speed among sub-paths, an alternative valid path that reaches the target may be additionally found.

Optionally, the method may also comprise generating a further scene, namely, a second 2D scene consistent with the subsequent velocity cone, which is different as its slope corresponds to a second speed and has an apex at the second source.

Optionally, the method may also comprise computing, in parallel, a visibility graph algorithm for the second 2D scene. Thereby, conflict-free sub-paths associated with the second speed can be obtained. The method further comprises composing an alternative valid path that results from including conflict-free sub-paths that the vehicle can traverse at the second speed.

Optionally, the method may additionally comprise selecting the first speed or the second speed for the vehicle to traverse a static or dynamic obstacle according to a selection criterion. Such selection criterion may take into account requirements like computational time, the traversed distance and/or the estimated arrival time, both defined for the vehicle to get from the first source to the target.

Optionally, the method may further comprise producing at least one offset polygon, e.g., for safety reasons. The offset polygon results from including a surrounding buffer area at the boundary of each interception polygon so that, the offset polygon may encompass buffer areas pertaining to more than one interception polygon if the buffer areas run into each other.

In respect of the system, it allows generating a path for a vehicle from a first source to a target within a 2D environment with one or more dynamic obstacles. The system includes a computing unit comprising a memory to store computer readable code and one or more processors to execute the code so that the following tasks may be performed:

Generating, in a 2D+t space, a velocity cone having a slope corresponding to a first speed and an apex at the first source at an initial time. The velocity cone represents a set of potential waypoints reachable from the first source for the vehicle moving at the first speed.

For each static or dynamic obstacle present in the 2D environment, providing a polytope in the 2D+t space. The polytope represents a 2D polygon modeling an obstacle at an initial time with its evolution over time.

Obtaining one or more interception polygons by intersecting the velocity cone with the polytope in the 2D+t space, thereby forming a non-planar surface, and projecting the non-planar surface on the 2D environment.

Generating a first 2D scene comprising the one or more interception polygons to avoid.

Computing a visibility graph algorithm for the generated first 2D scene based on a first number of vertices associated with the one or more interception polygons and obtaining a plurality of conflict-free sub-paths for the vehicle to traverse that avoids each static or dynamic obstacle.

Composing a valid path connecting the first source to the target based on the plurality of conflict-free sub-paths.

The system may also include several devices like sensors for gathering information about obstacles and a navigation unit to obtain the first source as a position of the vehicle and to process instructions for guiding said vehicle among obstacles according to the valid path that is conflict-free.

Advantageously, the system may be implemented in an autonomous or semi-autonomous vehicle, like a UAV or a ground robot.

Another aspect of the present disclosure relates to computer program product (e.g., a computer-readable medium) that includes computer code instructions that, when executed by a processor, causes the processor to perform the methods for generating a path for a vehicle from a first source to a target within a 2D environment with one or more dynamic obstacles, described above.

In general, according to the present teachings numerous functionalities and benefits may be offered to different domains. For instance, in the aerospace domain, this algorithm could assist the Pilot-in-Command (PIC) to identify a conflict avoidance path; in the self-driving cars domain this algorithm could help to avoid collisions with other cars.

In sum, the present teachings allow a moving vehicle to safely and efficiently continue its motion to a destination through moving or changing obstacles.

As a consequence, a significant reduction of unnecessary waypoints and sub-paths can be achieved while such reduction advantageously does not influence the result.

Advantageous developments of the method and system are discussed as follows. The features, functions, and advantages that have been discussed can be achieved independently in various examples or may be combined in yet other examples further details of which can be seen with reference to the following description and drawings.

BRIEF DESCRIPTION OF THE DRAWINGS

A series of drawings, which aid in better understanding the disclosure and which are presented as non-limiting examples and are very briefly described below.

FIG. 13 shows an example of geometric intersection in a 2D+t space of a static obstacle's polytope and a velocity cone.

FIG. 14 shows a projection on the XY plane of intersection points of FIG. 13 FIG. 15 shows an example of creation of an interception polygon using a convex hull.

FIG. 16 shows an application of an offset for two interception polygons resulting in one offset polygon.

DETAILED DESCRIPTION

Various examples illustrate the creation of autonomous conflict-free shortest lateral paths for generic vehicles in 2D+t dynamic environments in which the vehicle is considered as a point particle and obstacles are defined by polygons that can be static or modify their shapes and/or location. Importantly, the application of these teachings is not limited to the particulars set forth in the following detailed description or drawings.

The proposed solution is effective, robust and easy to implement, mainly due to a creation of a customized 2D+t visibility graph and certain assumptions.

Simplifications:

Likewise most of the existing solutions, successfully finding a free-collision path implies certain simplifications should be made:
  i) Environments are defined by a single vehicle, a source and a target and an indefinite number of static and dynamic obstacles. Obstacles can be regular or irregular polygons and they do not need to be convex.
  ii) Both, the vehicle and the moving obstacles travel on the same plane.
  iii) The vehicle is considered as a point, which is able to move to any location into the environment.
  iv) The vehicle and the obstacle's vertices travel following straight segments defined between two points.
  v) Vehicle's velocity is considered constant between waypoint segments. However, depending on the resolution strategy, some examples allow to modify the vehicle's velocity at every waypoint change.
  vi) Other dynamic aspects of the vehicle such as mass, accelerations, moments of inertia and forces are considered negligible.
  vii) Polygons are inflated in order to consider a safety distance. The vehicle's volume is taken into account by such distance, along with other parameters and safety considerations (e.g., maximum turn radius of a vehicle, distortion factors due to Earth's sphericity, minimum required lateral separation, etc.).

viii) The duration of the planning process is negligible; otherwise, the vehicle could move significantly from the initial planning position, invalidating a planned path.

ix) It does not consider any external factor such as wind, land surface or geodetic aspects. Thus, the wind is considered as null, land surface is planar without roughness and earth is approximated by a plane.

In the described 2D+t space, due to assumptions i) and iv), a static 2D object takes the form of a straight prism in 2D+t, whereas a moving polygon appears as a chain of one or more oblique prisms. This effect will be better appreciated in the next drawings.

Figure 1:
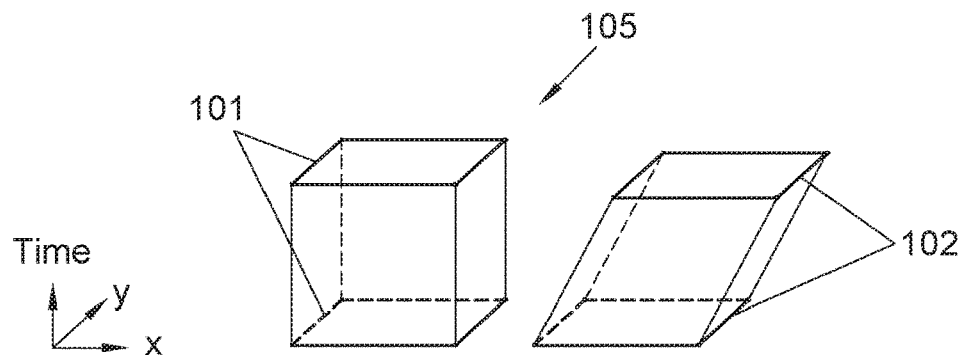
FIG. 1 shows a representation in a 2D+t space of an example of a static obstacle and an example of a moving obstacle.

FIG. 1 shows a representation in the 2D+t space (with axes X, Y, t) of a square obstacle. On the left, there is a static obstacle 101, whereas on the right a dynamic one, i.e., moving obstacle 102 that moves linearly between two positions. Both obstacles 101, 102 are rigid objects because their shape does not change over time.

Figure 2:
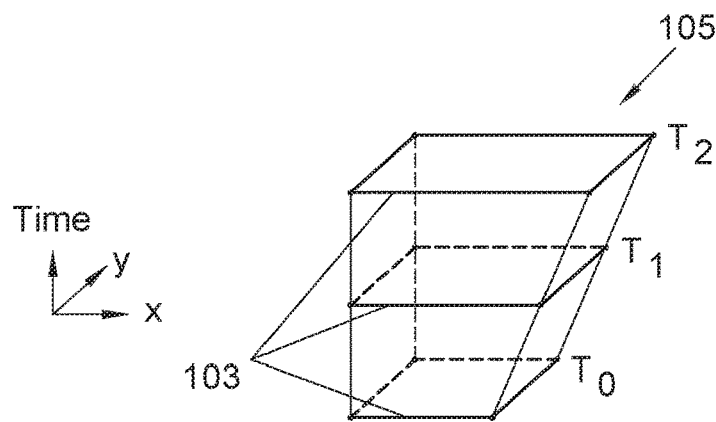
FIG. 2 shows a representation in a 2D+t space of an example of a morphing obstacle.

FIG. 2 shows a representation in the 2D+t space of a morphing obstacle 103. Morphing obstacles 103 are dynamic. They can rotate, resize, change shape or even have vertices that appear and disappear in time.

To support a non-rigid obstacle, its trajectory should be defined by the individual trajectories of its vertices. Back to FIG. 2, a static rectangle expands from $t=T_0$ to $t=T_2$ in the x direction, instead of moving as a rigid body like in FIG. 1. In any case, it results in a geometrical figure in the 2D+t space called polytope 105.

Consequently, at any time "t", the intersection of a horizontal plane at Z=t and a 2D+t polytope 105 represents a state of the obstacle at time t. For instance, the intermediate section in FIG. 2 corresponds to the state of the polygon at $t=T_1$.

Figure 3:
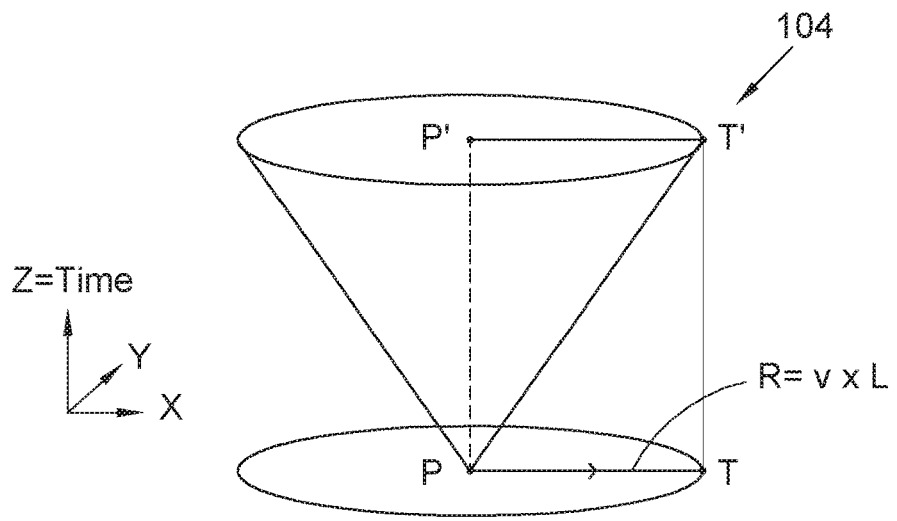
FIG. 3 shows a representation of an example of a velocity cone in a 2D+t space.

FIG. 3 depicts an example of a 2D+t geometry referred to as velocity cone 104. According to assumption iv), the vehicle travels at a constant speed v. At any time t, the locus of points that can be reached from a position P is a circle centered in P with a radius R=v*t. As time passes, the circle grows at a constant rate v. By extrapolating this concept to a 2D+t space, the illustrated straight velocity cone 104 with slope v and center in P is obtained, which is the geometric surface representing all the possible moves from P.

The present disclosure uses an approach based on a new visibility graph algorithm that presents some relevant aspects for the identification of the shortest path. Each node of the graph is an abstract container that stores a 2D+t position that corresponds to a possible waypoint with coordinates (x, y, t). This is a 2D+t point used for navigation purposes. Thus, in this document, the concept node is an abstract point of a graph and a waypoint is one of the ends of a leg of a path. There is a straightforward relationship between both concepts, node and waypoints, in such a way that they can be used almost interchangeably.

A sub-graph is any edge of a visibility graph connecting a pair of nodes/waypoints that are mutually visible.

Another essential part of the proposed algorithm is the concept of expanding the graph, which is the base for building the visibility graph that is later processed by a simple backtracking algorithm, which outperforms Dijkstra's algorithm. The task of expanding the graph involves progressively finding an interconnected set of waypoints that can be arranged in order to form feasible paths. As apparent, the fewer nodes and edges, the more efficient the algorithm will be.

Many different strategies to expand a graph within a 2D environment may be used. Yet not all of them are equally optimal.

Figure 4A:
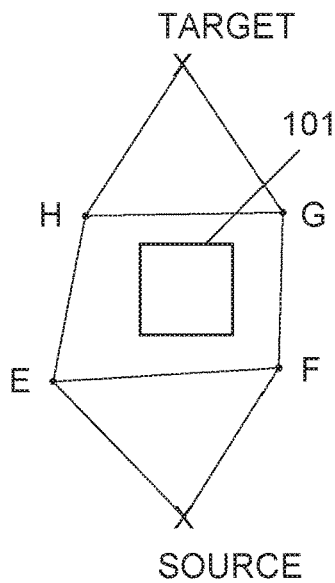
FIGS. 4A, 4B and 4C show examples of three free-collision graphs avoiding an obstacle in a 2D space.
Figure 4B:
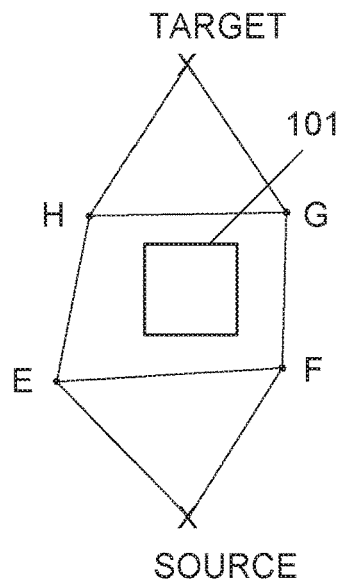
Figure 4C:
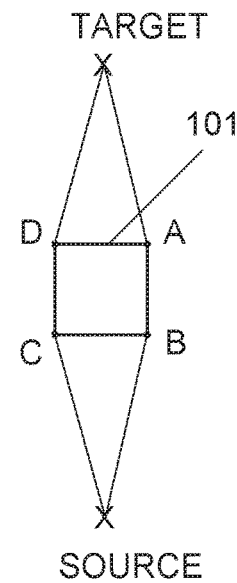

FIGS. 4A, 4B and 4C show examples of three possible graphs to avoid a static obstacle 101. The first graph of FIG. 4A, presented on the left, is less efficient because it does not reduce the number of possible vertices to visit and moreover, the possible paths obtained are far from the obstacle's boundary. The second central graph of FIG. 4B, on the center, removes two superfluous edges and is a more efficient version than the first. Finally, the third graph of FIG. 4C on the right is only based on visibility and contains the optimal paths: source→C→D→target, and: source→B→A→target. In FIG. 4C, both paths are exceptionally valid because the source and target points have been set in the symmetric line of the polygon. Generally, source and target points may be shifted from the symmetric line and, then only one path would be the geometric solution.

Figure 5:
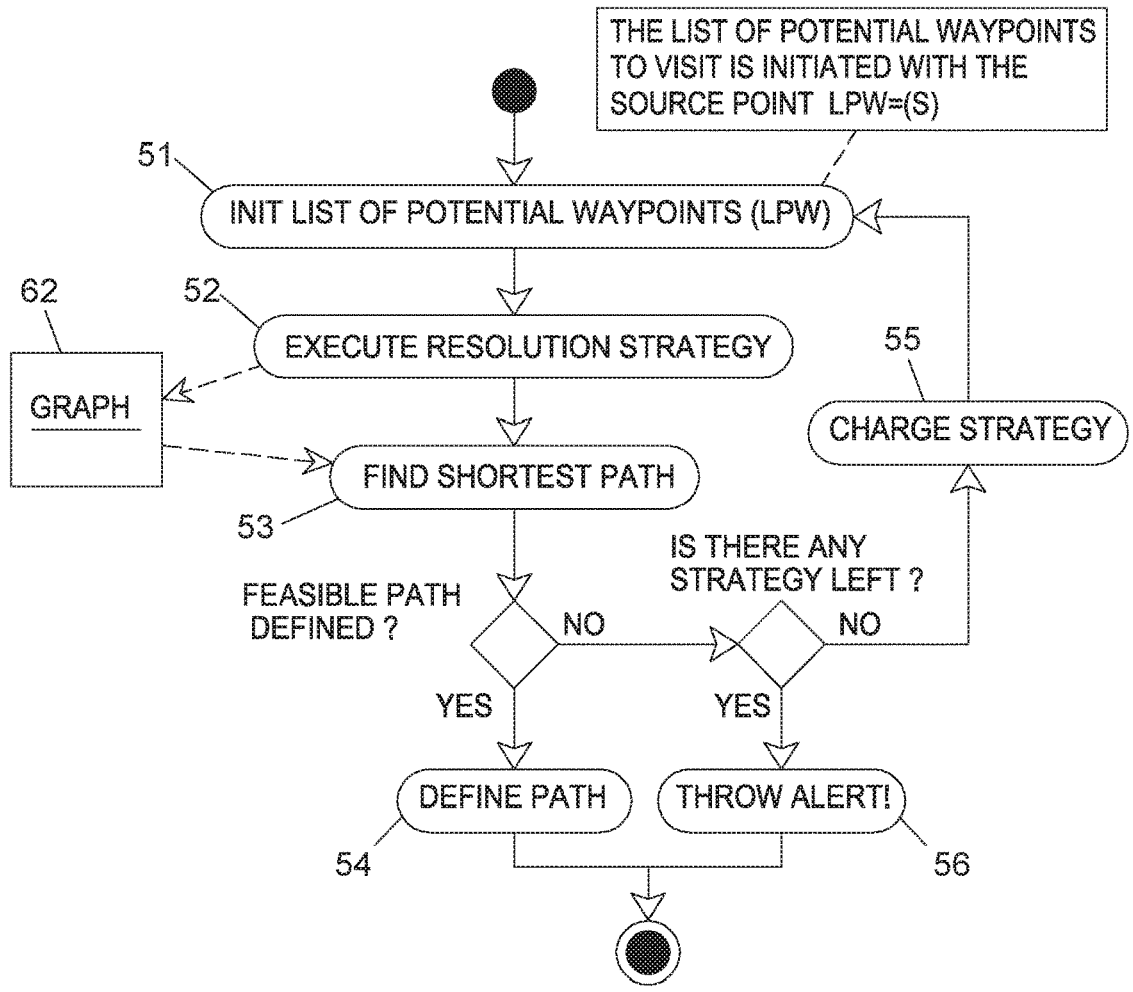
FIG. 5 shows a flow diagram of an overall example of a method for generating a path within a 2D environment with dynamic obstacles with high-level sub-processes.

FIG. 5 depicts an overall view of a flow chart of an example of a method for generating a path divided into six sub-processes. A sub-process is construed as a high-level task encompassing low-level tasks which include steps. This flow chart provides a top-down explanation of the algorithm implemented.

The method starts with a sub-process S1 for initialization of a repository called List of Potential Waypoints (LPW). The LPW stores both the waypoints (nodes) and the distances needed to reach them from a source or starting point. The waypoints will be traversed to expand the graph according to a visibility graph algorithm. The LPW can be seen as a dynamic container continuously updated through the algorithm execution. The LPW starts having a single waypoint S', which coincides with the current vehicle position (S).

The method continues with a sub-process S2 for executing a resolution strategy. After the initialization of the LPW, the algorithm is ready to expand the graph. In order to do so, three different high-level resolution strategies that can be provided by the user depending on his preference. The execution of any of the three strategies will produce a visibility graph that will contain the most promising possible paths to reach the target. Such three strategies are further explained in connection with FIGS. 6-9.

Then, it follows a sub-process S3 for finding the shortest path. Once the visibility graph is built, the shortest path must be extracted. In general, any shortest path algorithm like Dijkstra or A* can be suitable. However, the present disclosure preferably proposes an adapted visibility graph algorithm. The adapted visibility graph is able to provide a very simple graph with only one connection with the target. Thus, by backtracking from the target, the shortest path can be directly obtained. As a result, the adapted visibility graph algorithm increases efficiency because no additional graph search algorithm is needed. Furthermore, it guarantees the shortest path in the graph coincides with the shortest path in the environment.

Upon checking if the path that has been generated is considered acceptable from the vehicle's perspective, it follows a sub-process S4 for defining a path. Otherwise, the method jumps to sub-process S5.

As a result of the sub-process S4 for defining a path, if the shortest path is dynamically acceptable, the planned path supersedes the previous one, which would have collided if not altered.

The sub-process S5 for changing strategy is carried out when a previous strategy has provided a shortest path that is considered unacceptable from the dynamic point of view. It implies choosing the next strategy in a priority list defined by the user. Then, the process restarts in order to find a feasible solution with the new strategy.

Finally, if all strategies have been exhausted, a sub-process S6 comes into play for throwing an alert to the user in order to delegate the responsibility of deciding an alternative path.

Although the general view of the method has been conveniently contextualized, some tasks of the sub-processes may require more explanations to be better appreciated. They will be provided in the next paragraphs.

Figure 6:
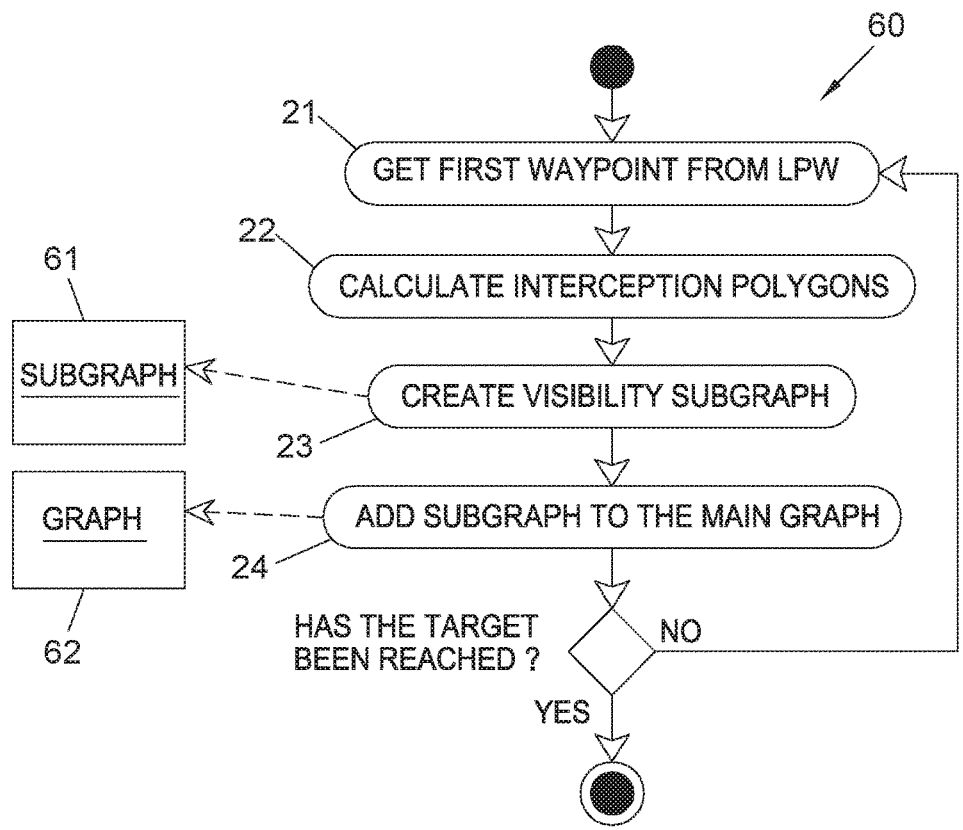
FIG. 6 shows a flow diagram of an example of a simple resolution strategy with high-level sub-processes.

Resolution Strategies:

FIG. 6 illustrates a first strategy choice denoted simple strategy 60. It uses a single constant vehicle's speed to calculate a possible path. The speed is defined at the beginning and maintained throughout the sub-graphs composing the trajectory. It should be noted that the rest of the strategies share these tasks. The simple strategy sub-process may encompass the following tasks:

A task 21 of getting a first potential waypoint of LPW. The most promising node according to the heuristic (called S') is identified from the LPW in order to be expanded. By construction, such node is always located at the first position of the list.

A task 22 of calculating interception polygons, from the intersection of the obstacles' polytopes and the velocity cone in the selected most promising node S'. Interception polygons represent the polygons that can be reached from S' at a specific time and speed. The task to calculate the interception polygons requires detailed explanations to be better understood. An activity diagram of this particular task is presented in FIG. 10.

A task 23 of creating a visibility subgraph. Once the most promising node S' is selected and its interception polygons are calculated, a visibility subgraph 61 can be then obtained. An activity diagram of this particular task is presented in FIG. 17.

A task 24 of adding a subgraph to the main graph. This task, in conjunction with the previous task 23, builds a more complex graph increasingly expanding it from the most promising nodes S' and taking into account their interception polygons. In other words, a set of visibility sub-graphs are progressively created and added to the overall visibility graph each time a most promising node S' is visited. Therefore, the outcome resulting from the execution of these tasks is an overall graph 62 made up by all the most promising conflict-free paths to arrive at the target point from the source.

Figure 7:
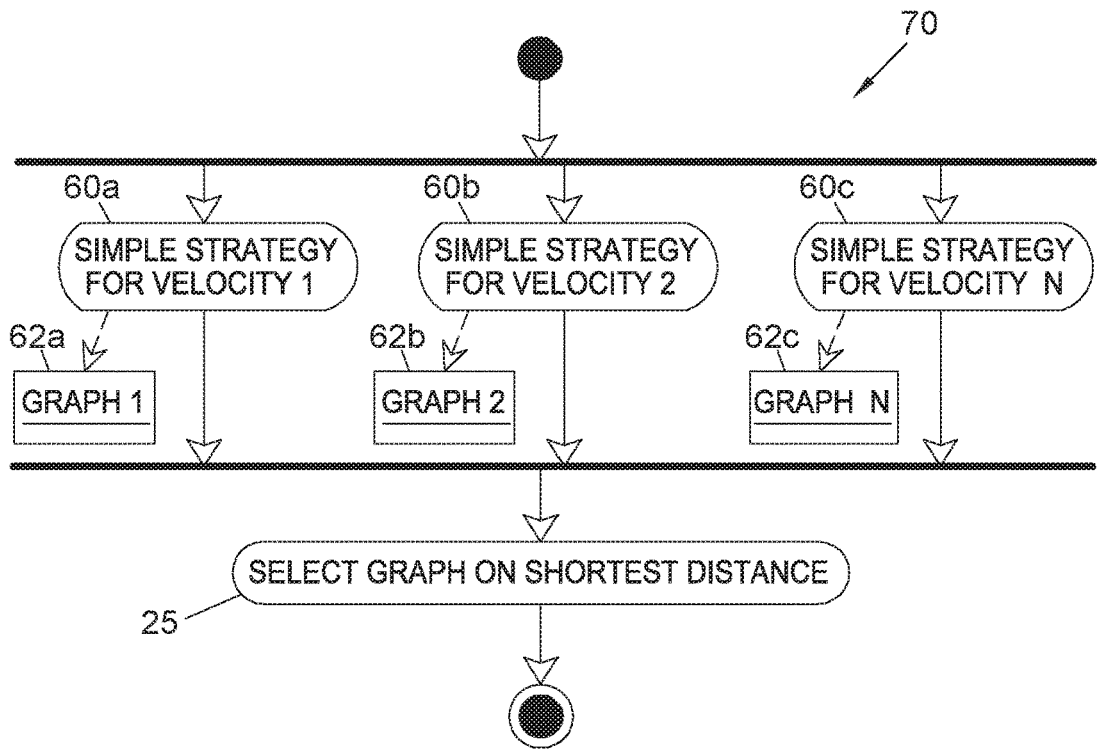
FIG. 7 shows a flow diagram of an example of a parallel resolution strategy with high-level sub-processes.

FIG. 7 schematically illustrates an activity diagram for a second strategy choice referred to as a parallel strategy 70. The parallel strategy 70 considers a user-configurable set of vehicle constant speeds (e.g., maximum, average and minimum) selectable to optimize the resulting path.

As shown in FIG. 7, several instances of the simple strategy 60a, 60b, 60c previously described run in parallel, each simple strategy instance 60a, 60b, 60c uses a different speed and provides its overall graph 62a, 62b, 62c. By doing so, computational efficiency can be increased. In addition, the parallel strategy 70 is able to avoid conflicts more effectively because of the multiple speed feature.

Once the parallel execution of instances is finished, the parallel strategy 70 further includes an additional task 25 of selecting a graph based on shortest distance.

Once each simple strategy instance 60a, 60b, 60c has been executed, not only a set of resulting overall graphs 62a, 62b, 62c is obtained but also an updated LPW in which, due to the heuristic, the length of the shortest path is linked to the final waypoint. Thus, this task 25 of selecting a graph comprises a comparison of the lengths of the shortest paths from the information contained in the corresponding LPW to select the most appropriate graph.

Figure 8:
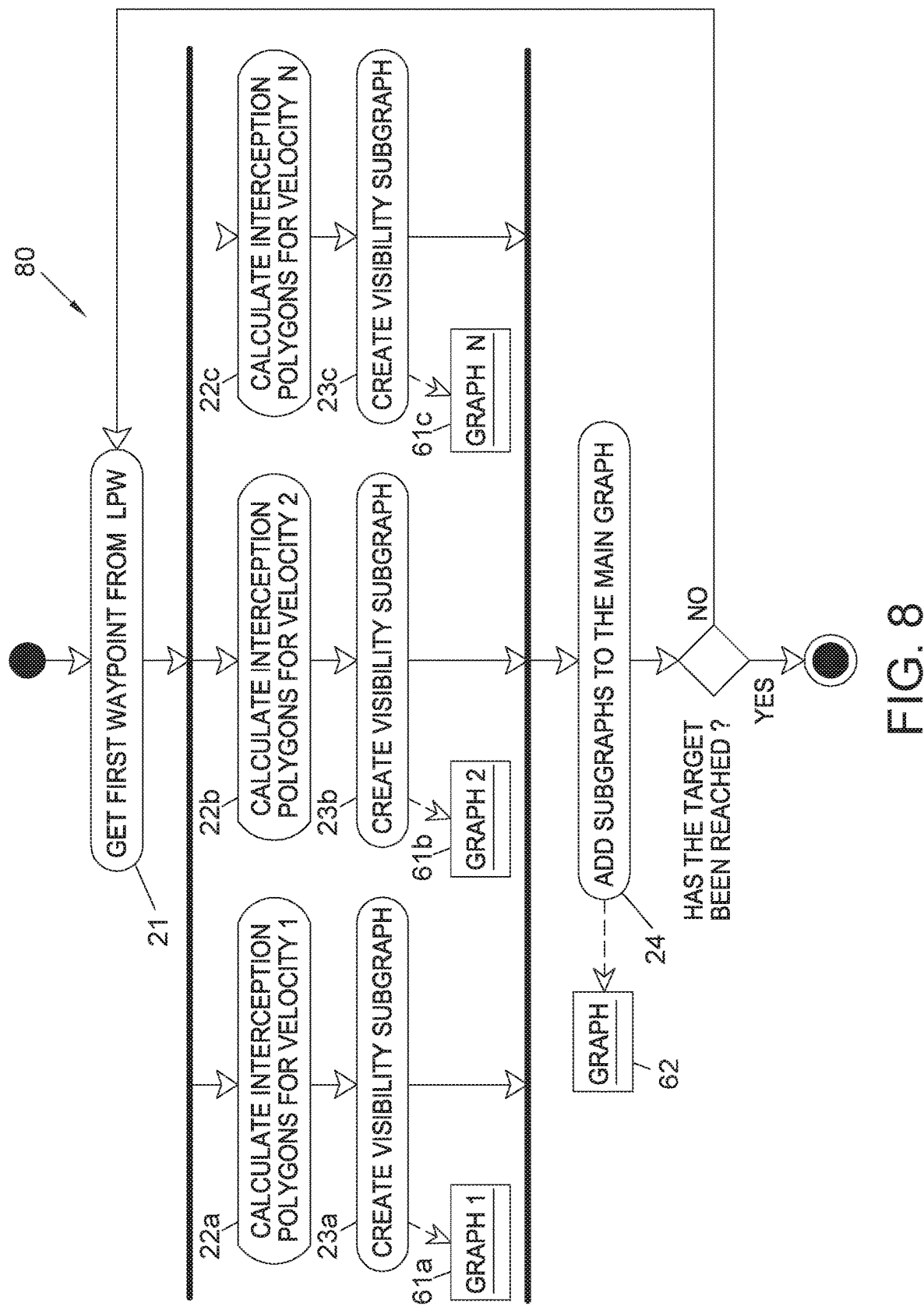
FIG. 8 shows a flow diagram of an example of a composite resolution strategy with high-level sub-processes.

FIG. 8 schematically illustrates an activity diagram for a third strategy choice referred to as a composite strategy 80, which assesses a set of constant speeds similar to the parallel strategy 70, but in addition allows the vehicle to change its speed at any waypoint, which allows smarter maneuvers and finer conflict avoidance. As shown in further examples of FIG. 22A and FIG. 22B, the heuristic used by the visibility graph helps reduce complexity of the composite strategy 80.

The composite strategy 80 performs similar actions to the parallel strategy 70 with little differences. There is also a first task 21 of getting a first potential waypoint of LPW. Then, rather than only one, several instances of a task 22a, 22b, 22c of calculating interception polygons are executed for each speed. Then several instances of a task 23a, 23b, 23c of creating a visibility subgraph follow which produce its own visibility subgraph 61a, 61b, 61c. This set of sub-graphs 61a, 61b, 61c is then included in the main graph according to task 24 of adding a subgraph to the main graph. By merging the sub-graphs and sharing a single LPW, the third strategy is able to consider speed changes from waypoint to waypoint and provide an overall graph 62.

Figure 9A:
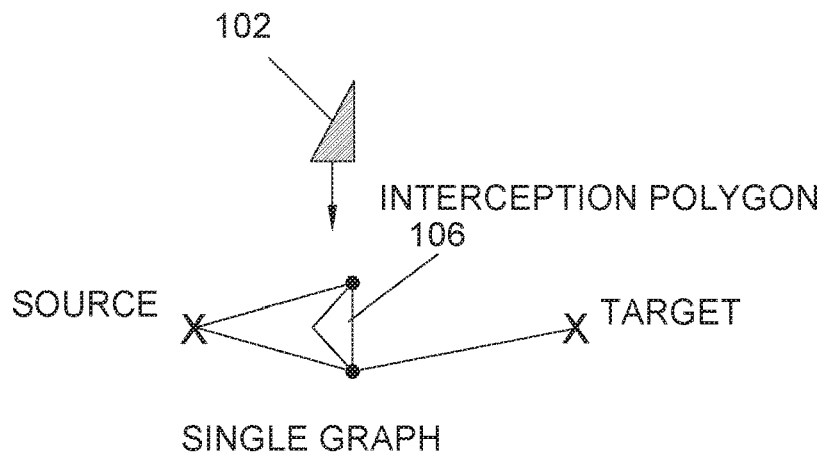
FIGS. 9A, 9B and 9C show resulting graphs for different resolution strategies.
Figure 9B:
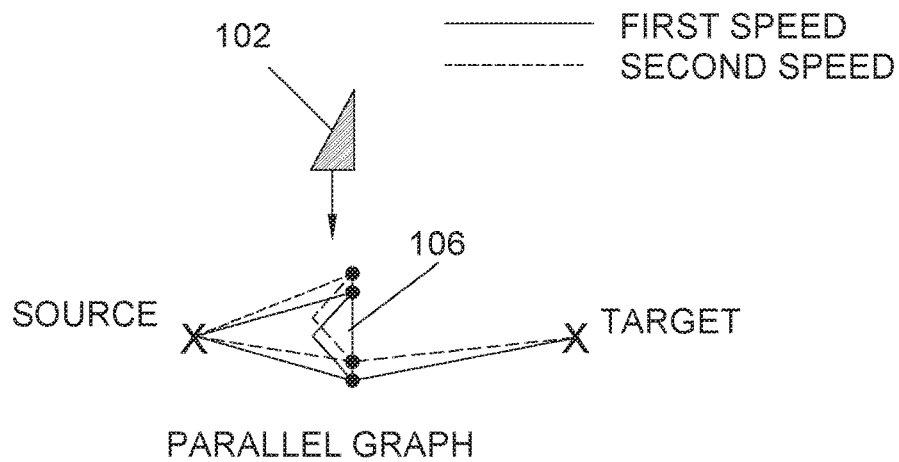
Figure 9C:
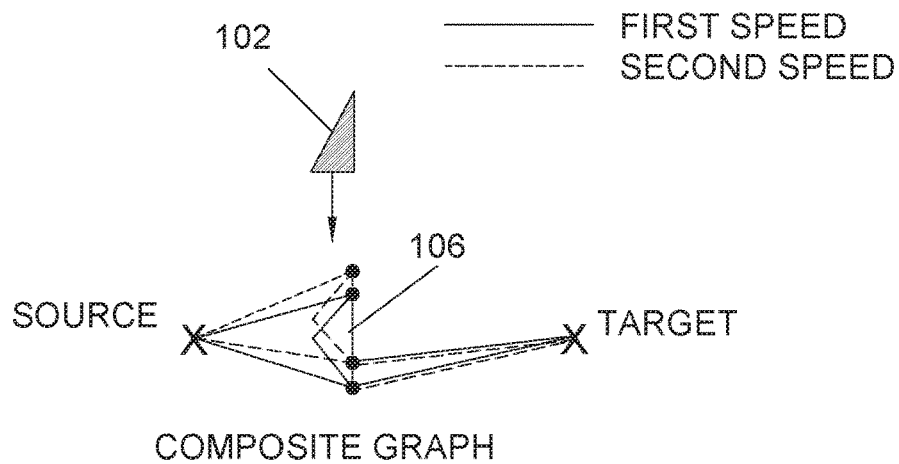

FIGS. 9A-9C graphically illustrate the behavior of each strategy over a simple environment. A continuous line represents sub-graphs traversed at a first speed, whereas a dotted line means that sub-graphs are traversed at a second speed. In the environment, between the source and the target there is an interception polygon 106 and a moving obstacle 102, the vehicle can travel using just two different speeds.

FIG. 9A is the resulting graph of applying the simple strategy at the first speed. FIG. 9B is the result of applying the parallel strategy either using the first speed or the second speed. Finally, FIG. 9C is the result of applying the composite strategy to find the best possible solution combining the two different speeds at each waypoint. In the latter cases, the velocity cone varies, so the resulting interception polygon 106 is different for each speed. As shown, at each waypoint there may be two possible solutions corresponding to the two different speeds. In this case, the difference between the two possible solutions (continuous and dotted lines) at one waypoint lies on the time to arrive at the target but not on the distance, because the distance in this case would be the same. Consequently, the composite solution produces only one resulting graph whose edges are a combination of the edges coming from moving at different speeds.

Figure 10:
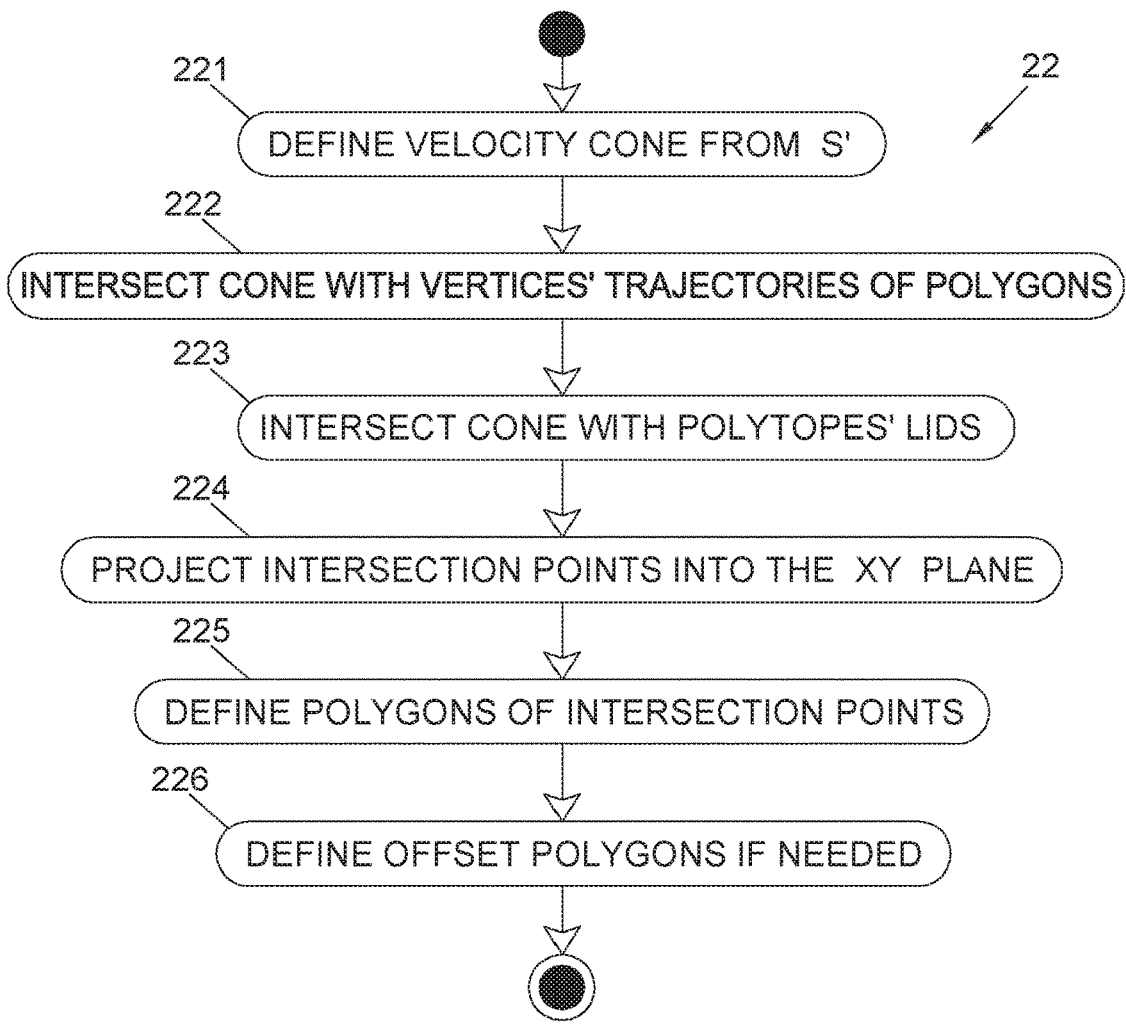
FIG. 10 shows a flow diagram of an example of a sub-process for calculating interception of polygons.

FIG. 10 shows in more detail a flow diagram of the steps related to the task 22 of calculating interception polygons, which is shared by the three resolution strategies.

This common task 22 of calculating interception polygons is key because it is responsible for dealing with static and dynamic (moving or morphing) obstacles and it comprises five steps.

A first step 221 of defining a velocity cone from S'. As explained previously, the velocity cone represents the set of points that the vehicle can reach from a point S' when traveling at a constant speed. It is geometrically defined by its apex: a waypoint S' in the 2D+t space and its slope, which is the inverse of the vehicle's speed (see FIG. 3 for more details).

A second step 222 of intersecting the velocity cone with vertices' trajectories of polygons, that is with the corresponding polytopes.

Once the polytope's edges intersection is completed, it follows a third step 223 of intersecting velocity cone with polytopes' lids. Having all the intersections for a certain obstacle computed, a 2D+t cloud of intersection points is obtained.

Then, common task 22 follows a fourth step 224 of projecting intersection points into the XY plane. By doing so, the dynamic problem is converted into a locally static problem. This cloud of intersection points has been generated taking into account the speeds at which both the vehicle and the obstacle are moving.

Then common task 22 follows the fifth step 225 of defining polygons of intersection points. According to the present approach, many different degrees of freedom to support morphing shapes of objects are allowed. Consequently, the correct ordering of intersection points is hard to discern. Therefore, it is needed to form simple, not self-intersecting, 2D polygons. This issue can be temporarily overcome by computing a bi-dimensional convex hull taking the projected points resulting from step 224. The convex hull of a set of points is the intersection of all convex sets containing them. In other words, it is the smallest convex set containing said set of points.

Advantageously, the path planning does not require polygons to be convex. The creation of an interception polygon by the convex hull is performed as a way of forming a polygon from an unsorted set of points. In the case where the intersection points are sorted, the convex hull step 226 of FIG. 10 can be skipped. Step 226 ensures a safety distance that prevents a violation of a no-fly zone (NFZ). It provides offset distances useful to mitigate some uncertainties. For instance, when the turn of an aircraft is not instant and requires a transition time. This can be compensated using offset distances.

The above steps show the transformation of a dynamic problem into a static one. Accordingly, a 2D scene is generated in a 2D region with the source, the target and motionless interception polygons. Visibility graph algorithms for finding a conflict-free path can be applied to this scene. Once obtained, the conflict-free path can be converted to the 2D+t space.

The second step 222 of FIG. 10 is further discussed in connection with FIGS. 11 and 12.

Figure 11:
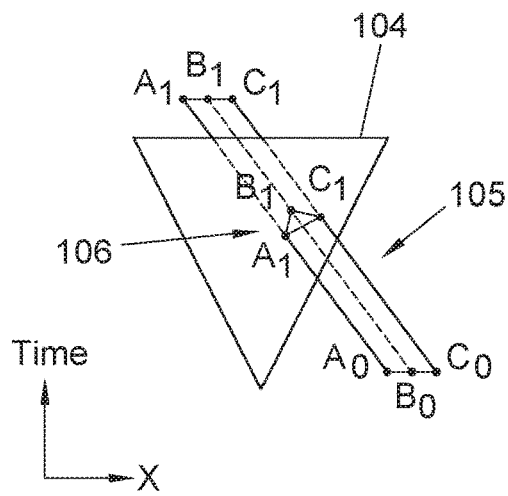
FIG. 11 shows a representation of an example of intersection between a polytope and a velocity cone.

FIG. 11 depicts an example of intersection of an obstacle moving at constant speed between time $t_0$ and $t_1$ in the X-axis. Note that in general, each vertex may intersect with the velocity cone at a different time.

The geometric intersection of the velocity cone and an obstacle's polytope yields a 2D+t non-planar region whose projection on the XY plane geometrically corresponds to the polygon that the vehicle must avoid to prevent a collision.

Figure 12:
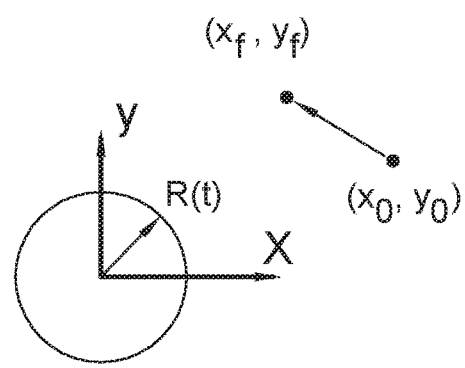
FIG. 12 shows an example of a calculation of intersection using 2D simplifications.

FIG. 12 describes a simplified approach for calculating an intersection in three dimensions. Although the actual intersection includes a set of interconnected three-dimensional (3D) conic curves, the problem may be addressed in a less complex way as follows: the velocity cone is treated as a circle in the XY plane that expands through time at a constant rate, whereas polygons are considered to be a set of vertices moving along independent piece-wise linear trajectories. The equations resulting from this approach are set forth:

$x(t)=x_0+v_x \cdot t$ $y(t)=y_0+v_y \cdot t$ $R(t)=v_{vehicle} \cdot t$ $f=x^2(t)+y^2(t)-R^2(t)$ The function f is defined as the difference of the squared distance from the point to the velocity cone apex and the squared distance of R(t). Squared distances provide an easy-to-solve equation and do not alter the result. If the 2D+t trajectory of vertex V intersects with the velocity cone, the function f will be equal to zero. This results in a second-order equation, which is not computationally complex to solve because it does not involve a numeric solving algorithm:

$f(t)=(v_x^2+v_y^2-v_{aircraft}^2)t^2+2(x_0v_x+y_0v_y)t+x_0^2+y_0^2=0$

When solving the equation, negative and imaginary times must be discarded, since they do not represent actual intersections with the velocity cone. The solution is also discarded if it is outside the 2D+t segment defined by the initial and final positions of the vertex. Aside from that, linear trajectories can intersect once or twice with the velocity cone, depending on the relative velocities and the initial position of the vertex. Therefore, each obstacle can produce one or two interception polygons.

The intersection calculation defined herein ensures optimality in most of the cases because:
  i) 2D shortest paths must always cross the trajectory of the obstacle vertices, and;
  ii) the number of points that define interception polygons are reduced.

Nevertheless, the case in which the vertex's speed is higher than the vehicle's speed would need either subdivision of polygon faces or a true 3D intersection method to provide the full set of conic intersections.

FIG. 13 shows a simplified version of a lid intersection for a static obstacle's polytope and the velocity cone in the 2D+t space as mentioned in the third step 223 of FIG. 10.

FIG. 14 shows the intersection points $A_i'B_i'C_i'$ on the XY plane corresponding to the example of FIG. 11 and to the fourth step 224 of FIG. 10. In this case, the surface of the velocity cone intersects the surface of the polytope in three different points, which correspond to its three vertices. FIG. 14 represents the projection on the XY plane of: the cone's base, the polytope's vertices, the two polytope's lids and the intersected points.

FIG. 15 shows the triangle of FIG. 11, once projected on the XY plane and once the convex hull is applied. The triangle $\overline{A_i'B_i'C_i'}$ would be an interception polygon seen from the apex of the velocity cone at a fixed speed v.

FIG. 16 shows an offset example with two original interception polygons 106 in continuous line and the resulting offset polygon 107 in dotted line. As depicted in FIG. 10, an optional sixth step 226 of defining offset polygons may be useful. Possible influence factors may be taken into account that make the vehicle enter in protected zones depending on the circumstances (e.g., position uncertainty, turn radius of the vehicle, wind, etc.). Accordingly, to prevent unexpected incursions, a safe buffer distance may be defined. Such buffer distance shifts the original interception polygons boundaries to produce new and safer interception polygons. In this example, due to the buffer distance, a buffer area surrounds both the first and the second interception polygons, thereby producing a single offset polygon, which may help simplify computation.

Figure 17:
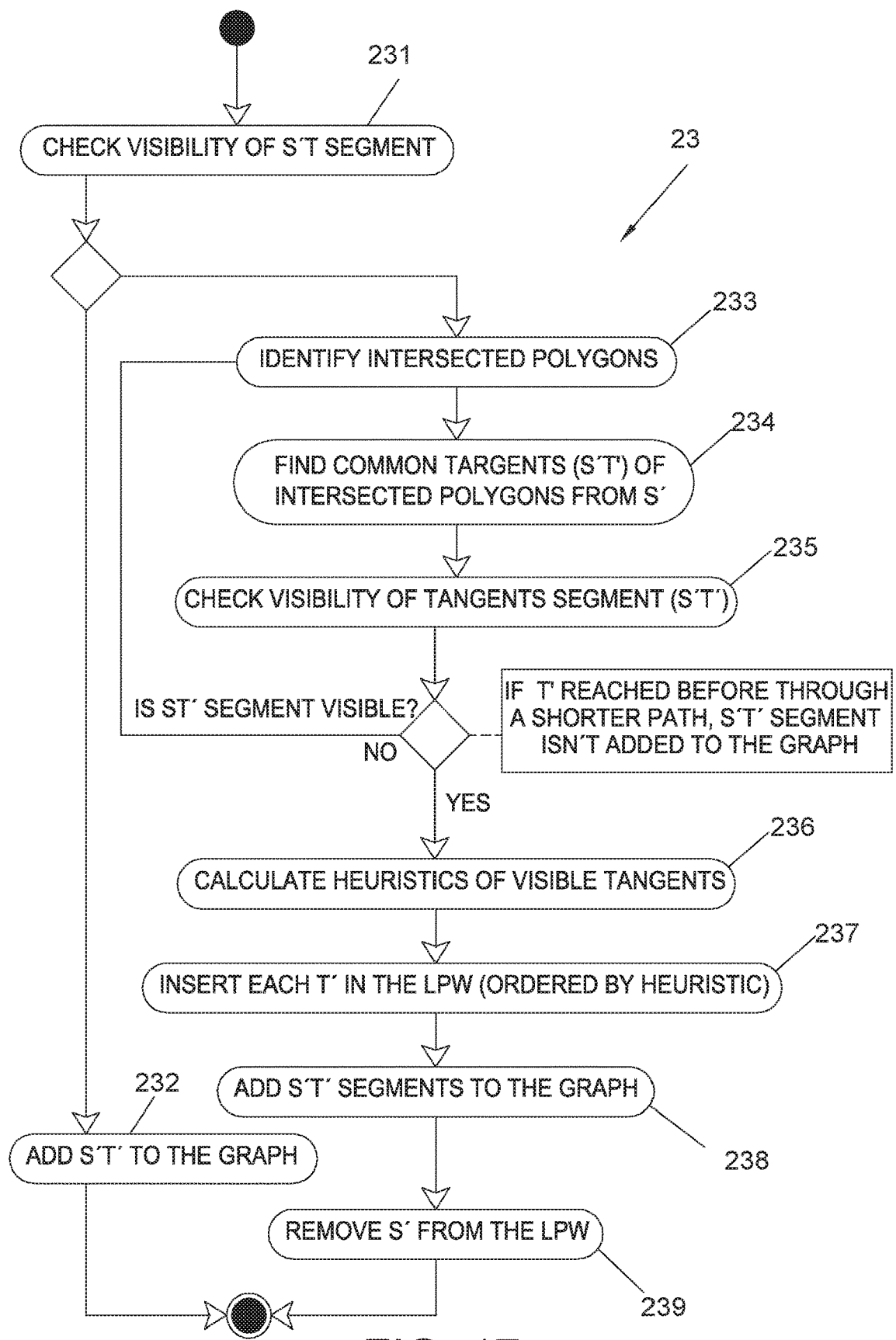
FIG. 17 shows a flow diagram of an example of a sub-process for creating a visibility subgraph.

FIG. 17 further illustrates task 23 of creating a visibility graph. As taught, this is a common task to the three different resolution strategies, as previously explained.

Even following the simple strategy of FIG. 6, finding a solution entails a complexity that would overwhelm any underpowered computer. Properly customizing a visibility graph algorithm along with the application of interception polygons allows lower requirements of computational resources. This task 23 is split into several implementing steps.

Firstly, there is a step 231 of checking the visibility of an S'T segment, where S' represents a node selected from the LPW as the most promising to reach the target. Hence, S' is the node to be expanded. On the other hand, T represents the target waypoint.

Assuming the target T has not been reached, then the segment S'T is not collision-free, the algorithm jumps to a step 233 of identifying intersected polygons.

Otherwise, if the S'T segment does not cross any interception polygon, the segment S'T is collision free, the diagram goes to step 232 of adding S'T to the graph. When this step is reached, a step 236 of calculating the heuristics of visible tangents assures that solving the current graph will provide an optimal solution without further expansion.

Back to step 233 of identifying intersected polygons, this is an efficiency-related step that reduces the complexity by selecting, and only paying attention to, those polygons that are obstructing the segment's visibility. Note that intersected polygons are crossed by the source-target line regardless of the polygon comes from an interception polygon or a NFZ.

As a consequence, filtering those obstacles whose inclusion in the graph is unnecessary dramatically improves performance. Polygons that are not crossed by the source-target line can be disregarded.

Figure 18:
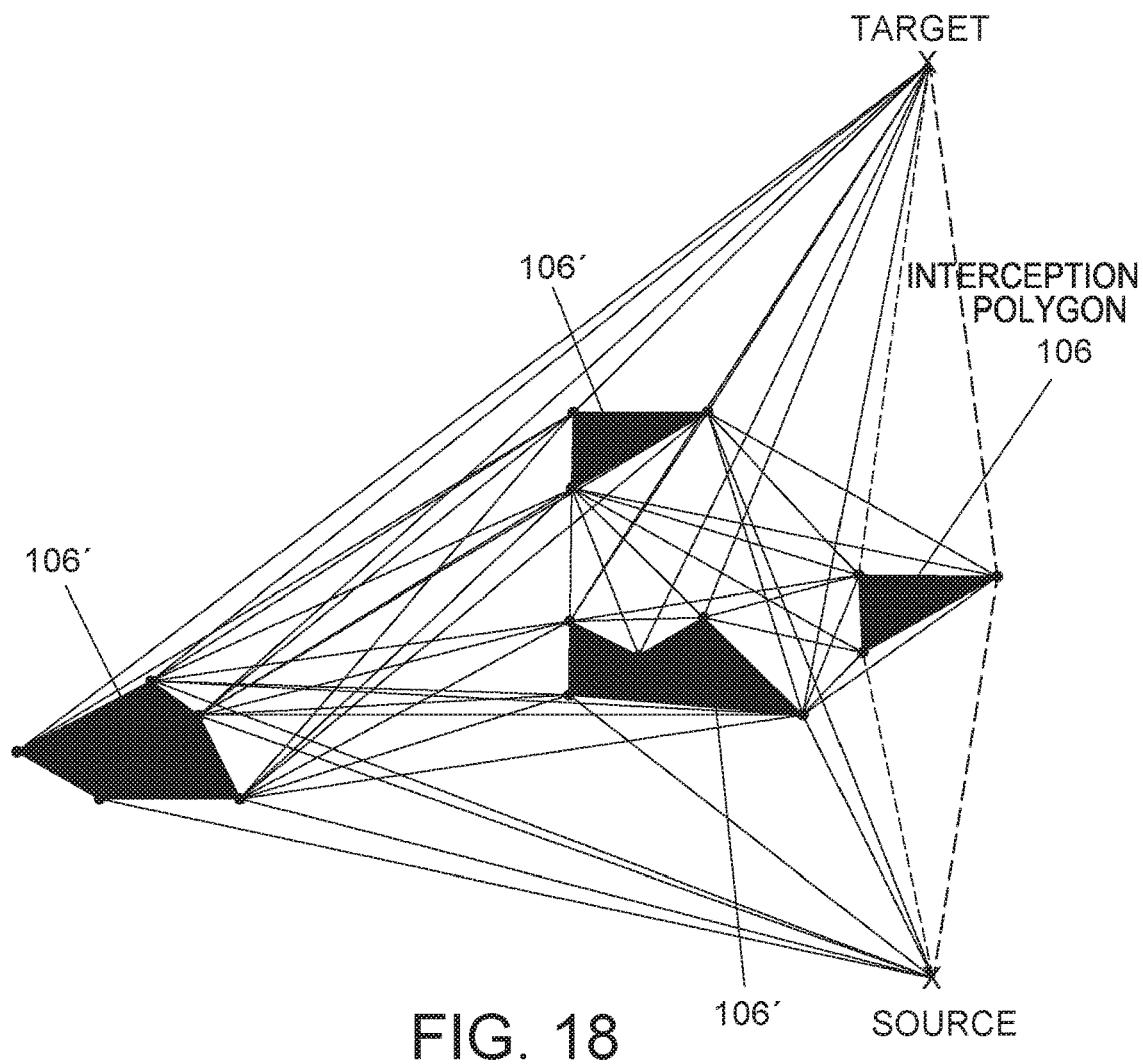
FIG. 18 shows a graphical example of complexity reduction using a heuristic to generate sub-paths.

FIG. 18 depicts an example of application of step 233. Step 233 speeds up finding a shortest path. Essentially, the algorithm is able to ignore three obstacles 106' and only considers one, namely the obstacle (i.e., interception polygon) 106 crossing the path to the target. The resulting path is shown in dotted line. Discarding the other obstacles greatly saves time and resources. For instance, in FIG. 18, there are 18 potential waypoints (16 vertices plus source and target). A naïve visibility graph algorithm would have generated a complete graph with 18 nodes and 71 edges, whereas the present approach is able to obtain the shortest path with only 4 nodes and 3 edges. Other algorithms considering all obstacles produce many unnecessary sub-paths as depicted in continuous line.

Another advantage of working with interception polygons is its validity for static and dynamic obstacles.

Referring back to FIG. 17, the next step is step 234 of finding common tangents (S'T') of intersected polygons from S'. Instead of building a full visibility graph, obstacles are avoided by finding the common tangents between S' and the interception polygons. The use of common tangents also produces a significant reduction in the size of the graph that leads to lower computation times.

Figure 19:
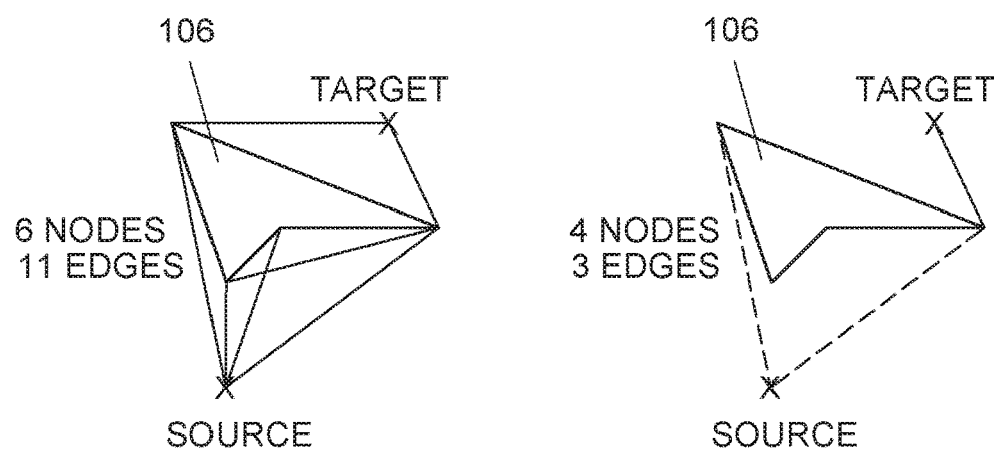
FIG. 19 shows an example of a further graphical comparison for generating common tangents as sub-paths for avoidance of non-convex obstacles.

FIG. 19 shows an example of said reduction in complexity of the graph even for a single obstacle achieved by using common tangents (dotted lines). Importantly, note that polygon's non-convexity does not exclude finding a valid path because the shortest path is proved to consist of common tangents.

Referring back to FIG. 17, step 235 of checking visibility of tangent segments (S'T'). T' represents any of the endpoints of the tangent segments. If a tangent segment is visible, the process can continue through step 236. If, however, a tangent segment S'T' intersects with any obstacle, the edge is not added to the graph and the obstacles involved and the algorithm jumps to step 233. With reference to FIGS. 20A-20F, this concept will be easily grasped.

A step 236 of calculating heuristics of visible tangents follows. When this step is reached, a set of segments are found which are tangent to those obstacles involved in the conflict. The heuristic is a criterion used to order the LPW in such a way that traversing the graph is more efficient than doing it following an arbitrary order.

Taking as input the endpoints T' of the visible tangents, which are potential waypoints, according to the heuristic, the minimum cost (in Euclidean distance) that visiting each waypoint may have is calculated.

Moving forward, a step 237 of inserting each T' in the LPW as ordered by heuristic follows. Once the S'T'T lengths have been calculated, the corresponding T' nodes are inserted in the LPW by comparing their associated heuristic values with those that were previously added to the list. Thus, the LPW will contain the list of all the potential waypoints ordered according to the distance S'T'T. The heuristic ensures that the actual cost of the S'T'T path is not overestimated because the actual distance can either be the length of the S'T'T path or greater, if there is an obstacle between T' and T. In the worst-case environment, all nodes would eventually be expanded; whereas, in most of the cases, the expanding process can be significantly reduced.

When a potential waypoint from the LPW is obtained (see FIG. 6, step 21), the graph is expanded through the branch that looks the most promising.

Note that using the heuristic criterion does not necessarily imply the right node is going to be expanded. In other words, using the heuristic does not discard any waypoints; it merely prioritizes them.

Nevertheless, as a result of employing the heuristic, the graph building process can be stopped whenever the target is reached for the first time. All the nodes that remain in the LPW are guaranteed to have a greater cost, even if a straight path from them to the target was collision free. Therefore, the effective resulting graph size is much smaller, which saves both memory and computer processing, especially in large environments. The static-obstacles example in FIGS. 20A-20F may further explain the benefit of the heuristic.

A further step 238 of adding S'T' segments to the graph follows. All S'T' segments are now collision free and can be added to the graph. However, the algorithm checks if T' has been reached before through a shorter path, in which case that S'T' segment is not added to the graph, reducing its complexity. The same logic applies to the insertion of points in the LPW.

Afterwards, there is a step 239 of removing S' from the LPW. Having expanded the graph from node S', the node is removed from the list. For the next iteration, the LPW will contain the potential waypoints that have progressively emerged from S'.

Summarizing, the flowchart in FIG. 17 illustrates the rules to find shortest paths in dynamic environments when moving obstacles traverse the environment and change their boundaries and/or location.

The main benefits and features of the algorithm are set forth below.

The application of a customized visibility graph to the problem of obstacle avoidance in 2D+t dynamic environments. Visibility graphs are generally constrained to static 2D configuration spaces and although 3D concepts have been reviewed in literature, they usually need to rely on either cell discretization or mathematical optimization processes, which make the algorithm suboptimal in the former case and slower in the latter.

It may deal with different planning strategies regarding the vehicle's speed, thus allowing speed changes as well as vectoring to solve conflicts more efficiently.

It is able to calculate optimal conflict-free paths in new domains, with obstacles that modify their shapes during the path definition (i.e., morphing polygons). Unlike probabilistic, genetic, Voronoi and most planners, the algorithm consistently expands the graph with optimal and valid sub-paths, thus reducing the trial-and-error iterative process and ensuring optimality.

Moreover, the algorithm is able to outperform competitors by using a sophisticated combination of two novel pruning strategies plus a non-novel third one: the novel identification of intersected polygons (step 233) and heuristic application (step 236) and, the visibility graph (step 234).

Finally, the algorithm has a logic which is easy to implement, is fast and robust, and is hence appropriate for real-time path planning in environments where obstacles can appear, disappear or change their intent at any time and a quick response is critical (e.g., for UAVs).

Robustness and performance may be verified in three exemplary simulations.

Tests:

This section analyzes the solutions obtained in different simulations carried out to assess the overall performance of the proposed techniques. Parameters such as the time needed to find a solution and the length of the shortest path are presented.

Three environments were selected in order to better present the algorithm's performance and features. Each environment presents some peculiarities and sums up how the algorithm deals with them. All simulations were performed on an HP G62 laptop with an Intel® Core™ i3 CPU M 350 processor, 4 GB RAM and Ubuntu 14.04. The code has been compiled in release version and the computation times correspond only to the CPU time used by the algorithm. Thus, the execution of the simulations was isolated from other processes running in the computer.

First Environment: Two Static Obstacles

FIGS. 20A through 20F illustrate a static-obstacles environment with invisible tangent. A sequence of performed steps is explained to define a route when a vehicle located at a source travels to a target avoiding obstacles on its way. The heuristic is based on the shortest metric distance.

Figure 20A:
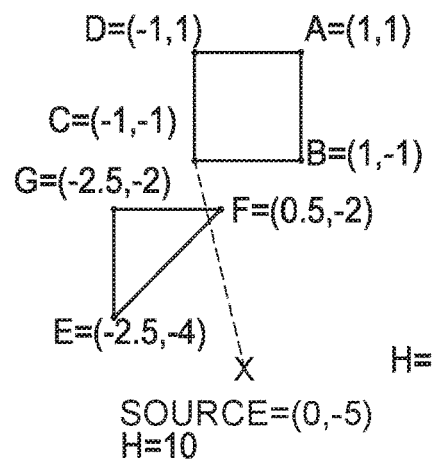
FIGS. 20A, 20B, 20C, 20D, 20E and 20F depict several stages of a graph expansion algorithm in a two-obstacle environment.
Figure 20B:
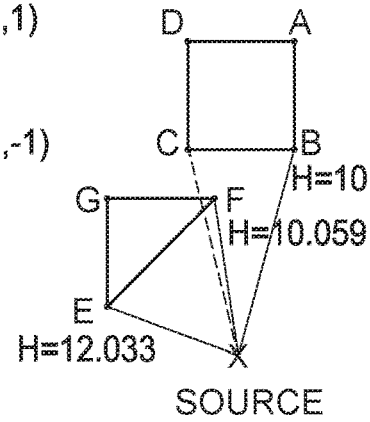

The obstacles consist of a quadrilateral ABCD and a triangle EFG. Since both obstacles are static, they are already interception obstacles. As FIG. 19 shows, given a point P, there exist two tangents for each polygon. Therefore, there should be 2N tangents from P to a set of N polygons. However, as noted in dotted line in FIGS. 20A-20B the tangent SC is not visible because it intersects the triangle. Thus, as depicted in FIG. 20B, only three edges, namely SE, SF and SB, are added to the graph in the first step.

From then on, the graph is built guided by the heuristic, step 236. Note that due to the heuristic and the algorithm's logic, the graph built will not contain two edges leading to the same node unless their path cost was the same. Otherwise, unnecessary edges like FB and BC would be added to the graph, hence worsening efficiency.

On the second step, the algorithm indicates the graph to expand from node F because the path S→F→T would be shorter than the path from B if there were no additional obstacles (S→B→T).

Figure 20C:
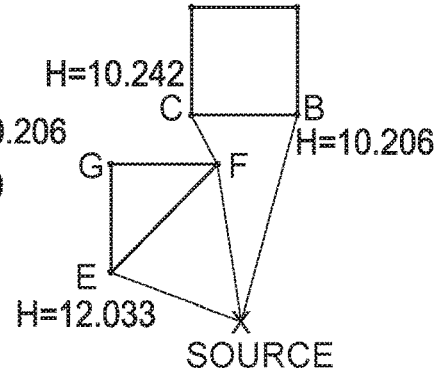

However, the straight path from F to the target collides with the square obstacle and it turns out that node C has a higher (worse) heuristic than B, as depicted in FIG. 20C. Note that segment FB is not added to the graph because it has already been reached through a shorter path.

Figure 20D:
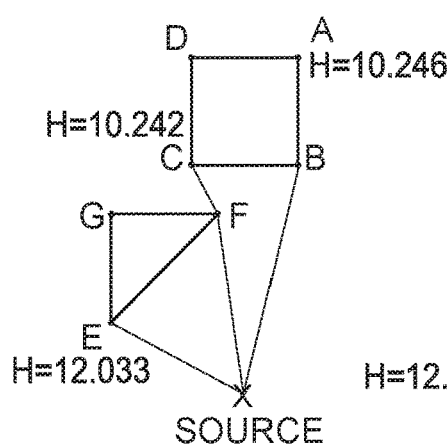

In FIG. 20D, the third step expands the graph from B because it has the lower heuristic from the LPW.

Figure 20E:
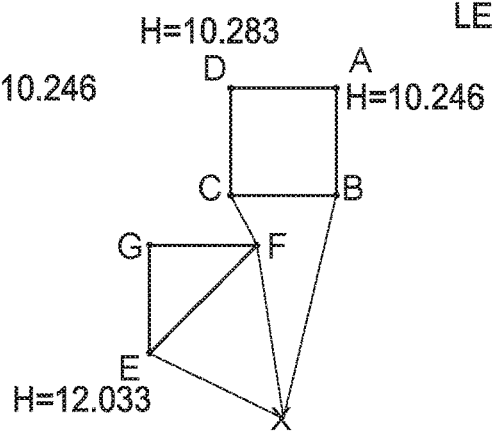

In FIG. 20E, the next step expands the graph from C because the path S→F→C→D→T is the shortest potential path that could be found.

Figure 20F:
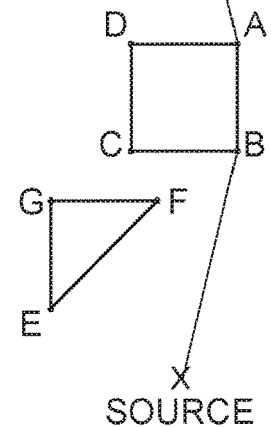

Finally, depicted in FIG. 20F, the last step connects A to the target because A has lower heuristic than D and the segment AT is collision-free. Since the graph is always expanded from the most-promising node, expanding the graph can be stopped once the target is reached.

Having built the graph, existing algorithms would now run a graph-based shortest path algorithm like Dijkstra's or A*. However, by backtracking the path from the target the resulting path S→B→A→T in FIG. 20D can be obtained effortlessly, which further simplifies the problem to a great extent.

Figure 21:
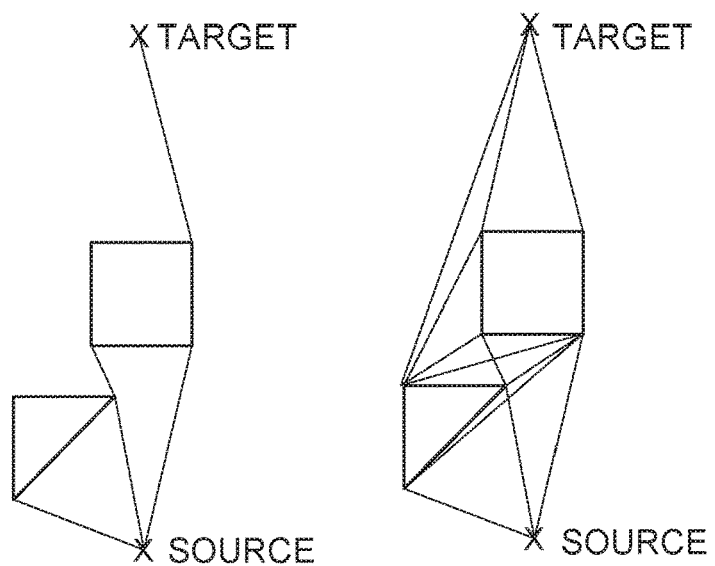
FIG. 21 shows an example of a comparison of the graph expansion of FIGS. 20A-20F and a typical visibility graph.

FIG. 21 shows on the right the graph generated by the algorithm, which only contains eight nodes and seven edges, whereas on the left, a typical visibility graph would have nine nodes and nineteen edges.

In order to establish a fair comparison between the present techniques and conventional ones, static objects should be treated as planar polygons. Moreover, the present algorithm's advantage over existing alternatives grows as the complexity of the environment increases. The computation time for this environment is 4.19 msec. This time includes the intersection of the cones and the static obstacles, which slows down the computation.

In the background of the present document, the present proposal is classified into the roadmap methods, which implies that the computation time is strongly related to both the number of vertices V and edges E contained in the graph. Thus, a reduction in E and V translates into a significant improvement in the computational performance. Consequently, the customized optimizations reduce the number of vertices and edges and boost performance remarkably.

Second Environment: Three Dynamic Obstacles

This second environment may serve for multi-speed planning and is especially interesting because it shows the planned path is straight at high speeds and it becomes longer as the vehicle slows down. At very low speeds, the straight path is also feasible. Note that although the obstacles may appear at different times, their motion is known a priori.

Figure 22:
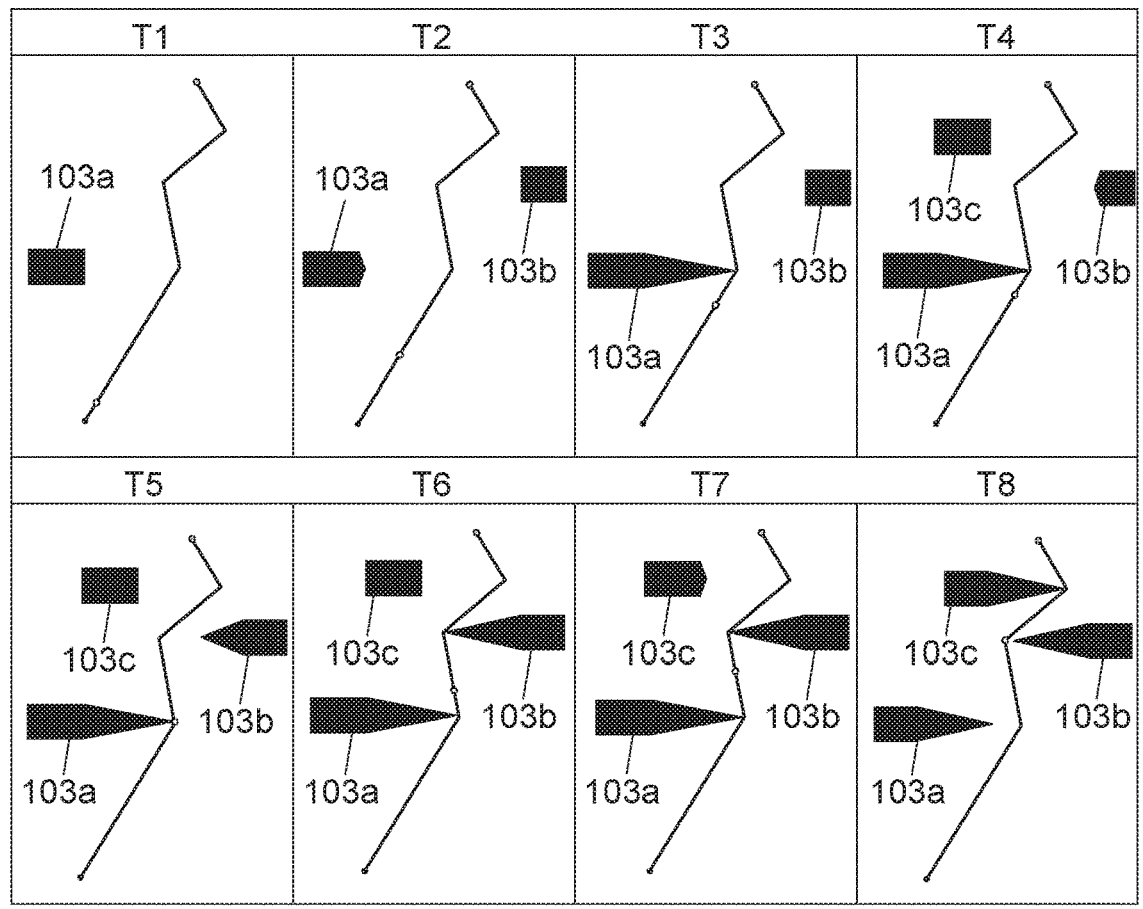
FIG. 22 shows an example of eight sequences displaying a vehicle moving along a computed free-collision path among three morphing polygons.

FIG. 22 depicts several sequences in an environment with dynamic obstacles that move and modify their shapes. There are up to three obstacles 103a, 103b, 103c that start being squares in the sequence they appear first, and later become animated pentagons. All three obstacles 103a, 103b, 103c follow a same motion pattern, but they appear at different times.

In the sequence of time T1, obstacle 103a appears and remains being a square until the sequence of time T2. Then, an extra vertex is created in the midpoint of one of its faces while a further obstacle 103b appears. The extra vertex of obstacle 103a moves outwards with a fast linear motion. Finally, the vertex retreats slowly to its initial position and the obstacle 103a disappears. The same motion procedure is observed in all the obstacles 103a, 103b, 103c on scene for simplicity.

A summary of the experimental results is shown in the table below. The three strategies were applied in the performed simulations at different vehicle speeds:

| Vertices in the scene | Graph nodes | $\frac{Dist. - \text{Straight } dist.}{\text{Straight } dist.}$ ( ) | Speed set | Computing time(ms) | Strategy |
|---|---|---|---|---|---|
| 15 | — | 0 (straight line) | <=1.25 | 0.71 | Single |
| 15 | 3 | 0.01 | 1.3 | 2.74 | Single |
| 15 | 4 | 0.23 | 1.5 | 2.92 | Single |
| 15 | 11 | 6.30 | 2.0 | 7.82 | Single |
| 15 | 4 | 0.06 | 3.0 | 2.52 | Single |

| Vertices in the scene | Graph nodes | $\frac{Dist. - \text{Straight } dist.}{\text{Straight } dist.}$ ( ) | Speed set | Computing time(ms) | Strategy |
|---|---|---|---|---|---|
| 15 | — | 0 (straight line) | 4.0 | 0.73 | Single |
| 15 | — | 0 (straight line) | {1.25, 2.0, 3.0} | 0.71 | Parallel |
| 15 | 10 | 0.23 | {1.5, 2, 2.5} | 7.34 | Composite |

As explained, the first strategy, called single, internally creates a single directed graph that corresponds to the speed at which the vehicle must move at all times. The shortest path identified in such graph is the resultant shortest lateral path. The first six cases in the table use this strategy.

In the second strategy, called parallel, the algorithm is allowed to plan for N speeds, generates N separate graphs and chooses the optimal of the N constant speed optimal solutions. Despite computation time being increased, it provides a shorter path.

Finally, the third strategy, called composite, allows the planner to change the vehicle's speed at every waypoint. Hence, a single graph is generated and the heuristic can prioritize nodes that correspond to different speeds. Consequently, the last simulation from the table takes longer (7.34 msec) than the third one (2.92 msec) but much less than the sum of three separate executions. In FIG. 22, the worst case for computation time and travelled distance is shown.

Figure 23:
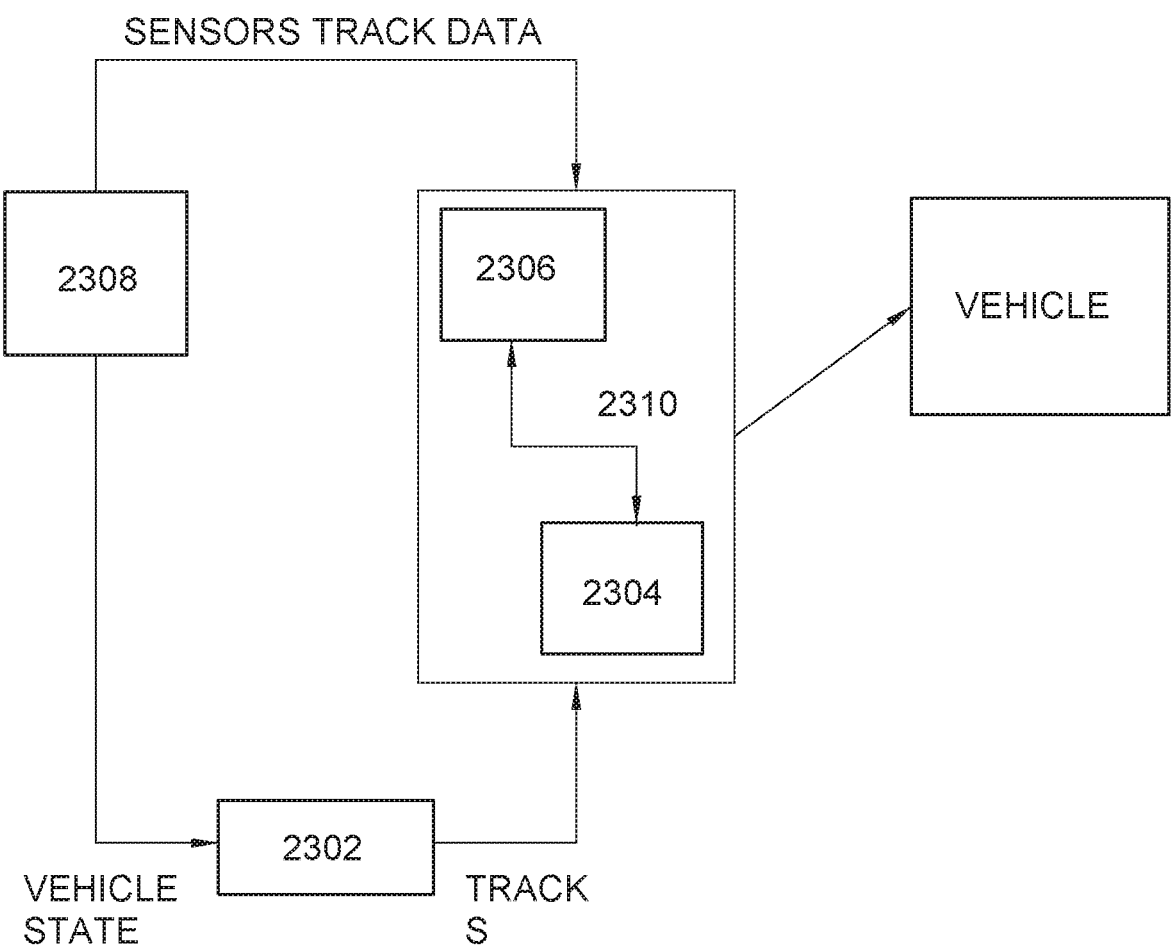
FIG. 23 shows a high-level block diagram of an overall example of a system for generating a path for a vehicle within a 2D environment with dynamic obstacles.

FIG. 23 is a high-level block diagram of an example of a system that avoids static and dynamic obstacles and generates a valid (conflict-free) path for a vehicle. The system includes a computing unit 2310 that comprises an internal memory 2306 and one or more processors 2304. The memory 2306 stores the computer readable code, which is executed by the processor 2304 and performs the tasks required for the identification of conflict-free paths to safely reach the target. The system may include sensors 2308 that detect the presence of and gather information about obstacles, mainly their positions and shape over time. In turn, a navigation unit 2302 may intermittently obtain the position of the vehicle to process instructions for guiding the vehicle among the obstacles following the generated conflict-free path.

Assuming the vehicle is an aerial vehicle (e.g., a UAV), the computing unit 2310 may perform several processes. A first process may relate to obtaining sensor tracks from different sensors. The computing unit 2310 may filter and merge these sensor tracks to create a unique fusioned track per flight. A second process may relate to obtaining fused tracks and the vehicle state to predict intruder trajectories and identify potential conflicts. A third process may be required for safely reaching the target as already described in the present disclosure. This process can also be in charge of sending the new deconflicted trajectory to a control system of the vehicle.

Therefore, sensors should detect the presence of intruders and/or obstacles and gather information from them. The navigation unit 2302 is needed to obtain the status of the vehicle (e.g., velocity, altitude, position, etc.). A control system present in the vehicle is in charge of processing the instructions for guiding the vehicle among the obstacles following the generated conflict-free path.

The invention claimed is:

1. A computer-implemented method for generating a path for a vehicle from a first source to a target within a two-dimensional (2D) environment with one or more obstacles, the method comprising:

generating, in a two dimensions plus time (2D+t) space, a velocity cone having a slope corresponding to a first speed and an apex at the first source at an initial time, wherein the velocity cone represents a set of potential waypoints reachable from the first source for the vehicle moving at the first speed;

for each obstacle present in the 2D environment, wherein the obstacle is a static obstacle or a dynamic obstacle, providing a polytope in the 2D+t space, wherein the polytope represents a 2D polygon modeling an obstacle at an initial time with its evolution over time;

obtaining one or more interception polygons by intersecting the velocity cone with the polytope in the 2D+t space, thereby forming a non-planar surface, and projecting the non-planar surface on the 2D environment;

generating a first 2D scene comprising the one or more interception polygons to avoid;

computing a visibility graph algorithm for the first 2D scene based on a first number of vertices associated with the one or more interception polygons and obtaining a plurality of conflict-free sub-paths for the vehicle to traverse that avoids each obstacle;

composing a valid path connecting the first source to the target based on the plurality of conflict-free sub-paths;

producing instructions for guiding the vehicle among the obstacles according to the valid path; and controlling movement of the vehicle in accordance with the instructions.

2. The method of claim 1, wherein the visibility graph algorithm applies a vertex reduction heuristic based on checking visibility of a segment from the first source to the target among the one or more interception polygons.

3. The method of claim 2, wherein the vertex reduction heuristic is further based on:

computing a common tangent segment to each interception polygon being crossed and adding to a list endpoints of the common tangent segment as potential waypoints; and backtracking the potential waypoints from the target to the first source.

4. The method of claim 1, wherein once a waypoint is included in a sub-path, said added included waypoint becomes a second source to construct a subsequent velocity cone until the target is reached.

5. The method of claim 4, further comprising:

generating a second 2D scene according to the subsequent velocity cone, wherein the subsequent velocity cone is constructed having a slope corresponding to a second speed and an apex at the second source, the second speed being different than the first speed.

6. The method of claim 5, further comprising:

computing, in parallel, a visibility graph algorithm for the second 2D scene, thereby obtaining a plurality of conflict-free sub-paths associated with the second speed; and composing an alternative valid path based on the plurality of conflict-free sub-paths for the vehicle to traverse at the second speed.

7. The method of claim 5, further comprising:
computing, in parallel, a visibility graph algorithm for the second 2D scene, thereby obtaining a plurality of conflict-free sub-paths associated with the first speed or the second speed; and
composing an alternative valid path based on the plurality of conflict-free sub-paths, wherein at least one conflict-free sub-path is traversed at the second speed.

8. The method of claim 6, further comprising selecting the first speed or the second speed for the vehicle to traverse an obstacle according to a selection criterion based on at least one of the following: estimated arrival time, computation time and traversed distance from the first source to the target.

9. The method of claim 1, wherein computing the visibility graph algorithm further comprises producing at least one offset polygon, wherein the offset polygon is produced by a buffer area surrounding at least one of the one or more interception polygons.

10. A system for generating a path for a vehicle from a first source to a target within a 2D environment with one or more obstacles, the system comprising:
a computing unit comprising a memory storing computer readable code and at least one processor to execute the computer readable code to cause the at least one processor to:
generate, in a 2D+t space, a velocity cone having a slope corresponding to a first speed and an apex at the first source at an initial time, wherein the velocity cone represents a set of potential waypoints reachable from the first source for the vehicle moving at the first speed;
provide a polytope in the 2D+t space for each obstacle present in the 2D environment, wherein the obstacle is a static obstacle or a dynamic obstacle, wherein the polytope represents a 2D polygon modeling an obstacle at an initial time with its evolution over time;
obtain one or more interception polygons by intersecting the velocity cone with the polytope in the 2D+t space thereby forming a non-planar surface, and project the non-planar surface on the 2D environment;
generate a 2D scene comprising the one or more interception polygons to avoid;
compute a visibility graph algorithm for the 2D scene based on a first number of vertices associated with the one or more interception polygons and obtaining a plurality of conflict-free sub-paths for the vehicle to traverse that avoids each obstacle; and
compose a valid path connecting the first source to the target based on the plurality of conflict-free sub-paths,
wherein the processor is further configured to produce instructions for guiding the vehicle among the one or more obstacles according to the valid path, the system further comprising a control system on-board the vehicle configured for controlling movement of the vehicle in accordance with the instructions.

11. The system of claim 10, wherein the visibility graph algorithm applies a vertex reduction heuristic based on checking visibility of a segment from the first source to the target among the one or more interception polygons.

12. The system of claim 11, wherein the vertex reduction heuristic is further based on:
computing a common tangent segment to each interception polygon being crossed and adding to a list endpoints of the common tangent segment as potential waypoints; and
backtracking the potential waypoints from the target to the first source.

13. The system of claim 10, wherein once a waypoint is included in a sub-path, said added included waypoint becomes a second source to construct a subsequent velocity cone until the target is reached.

14. The system of claim 13, wherein the processor is further configured to generate a second 2D scene according to the subsequent velocity cone, wherein the subsequent velocity cone is constructed having a slope corresponding to a second speed and an apex at the second source, the second speed being different than the first speed.

15. The system of claim 10, wherein computing the visibility graph algorithm further comprises producing at least one offset polygon, wherein the offset polygon is produced by a buffer area surrounding at least one of the one or more interception polygons present in the 2D scene.

16. The system of claim 10, further comprising a plurality of sensors for gathering information about obstacles present in the 2D environment, wherein the computing unit receives the information from the plurality of sensors and provides a polytope in the 2D+t space for each obstacle based on the received information.

17. The system of claim 10, further comprising a navigation unit to obtain the first source as a position of the vehicle and provide the obtained information to the computer unit.

18. A non-transitory computer program product for generating a path for a vehicle from a first source to a target within a 2D environment with one or more obstacles, the non-transitory computer program product comprising computer code instructions that, when executed by a processor, cause the processor to perform a method comprising:
generating, in a two dimensions plus time (2D+t) space, a velocity cone having a slope corresponding to a first speed and an apex at the first source at an initial time, wherein the velocity cone represents a set of potential waypoints reachable from the first source for the vehicle moving at the first speed;
for each obstacle present in the 2D environment, wherein the obstacle is a static obstacle or a dynamic obstacle, providing a polytope in the 2D+t space, wherein the polytope represents a 2D polygon modeling an obstacle at an initial time with its evolution over time;
obtaining one or more interception polygons by intersecting the velocity cone with the polytope in the 2D+t space, thereby forming a non-planar surface, and projecting the non-planar surface on the 2D environment;
generating a first 2D scene comprising the one or more interception polygons (106) to avoid;
computing a visibility graph algorithm for the first 2D scene based on a first number of vertices associated with the one or more interception polygons and obtaining a plurality of conflict-free sub-paths for the vehicle to traverse that avoids each obstacle; and
composing a valid path connecting the first source to the target based on the plurality of conflict-free sub-paths.

19. The non-transitory computer program product of claim 18, wherein the visibility graph algorithm applies a vertex reduction heuristic based on checking visibility of a segment from the first source to the target among the one or more interception polygons.

20. The non-transitory computer program product of claim 19, wherein the vertex reduction heuristic is further based on:

computing a common tangent segment to each interception polygon being crossed and adding to a list endpoints of the common tangent segment as potential waypoints; and backtracking the potential waypoints from the target to the first source.

* * * * *